US012789485B2

(12) United States Patent
Green

(10) Patent No.: US 12,789,485 B2
(45) Date of Patent: Nov. 10, 2026

(54) POLYMERIC BASED MULTI-MATERIAL MULTI-LAYER GEOMETRICALLY ENHANCED STRUCTURAL COMPOSITIONS AND RELATED METHODS

(71) Applicant: Green Eagle USA, LLC, Georgetown, SC (US)

(72) Inventor: Guerry E. Green, Georgetown, SC (US)

(73) Assignee: Green Eagle USA, LLC, Georgetown, SC (US)

( * ) Notice: Subject to any disclaimer, the term of this patent is extended or adjusted under 35 U.S.C. 154(b) by 9 days.

(21) Appl. No.: 19/036,361

(22) Filed: Jan. 24, 2025

(65) Prior Publication Data

US 2026/0027791 A1 Jan. 29, 2026

Related U.S. Application Data

(60) Provisional application No. 63/675,938, filed on Jul. 26, 2024.

(51) Int. Cl.
*B29D 7/00* (2006.01)
*B29K 667/00* (2006.01)
*C09J 5/06* (2006.01)

(52) U.S. Cl.
CPC .................. *B29D 7/00* (2013.01); *C09J 5/06* (2013.01); *B29K 2667/003* (2013.01)

(58) Field of Classification Search
None
See application file for complete search history.

(56) References Cited

U.S. PATENT DOCUMENTS 4,132,755 A * 1/1979 Johnson ................ B29C 70/443 425/389
5,849,083 A 12/1998 Milliman
9,981,411 B2 * 5/2018 Green ..................... B32B 27/20
10,913,220 B2 2/2021 Laberge Lebel et al.
2007/0126142 A1 6/2007 Zhou et al.
2010/0024958 A1 * 2/2010 Sawicki .................. B29C 73/10 425/14

(Continued)

FOREIGN PATENT DOCUMENTS

JP 2005144865 A 6/2005
WO WO-2023127893 A1 * 7/2023 ............... B05D 1/28

OTHER PUBLICATIONS

WO-2023127893-A1—machine translation (Year: 2023).*

*Primary Examiner* — Michael N Orlando
*Assistant Examiner* — Abhishek A Patwardhan
(74) *Attorney, Agent, or Firm* — Bryan L. Baysinger; Maynard Nexsen PC

(57) ABSTRACT

The present invention discloses a multi-material, multi-layer, geometric infilled component, including: providing a geometric infill to a cross-head die, the geometric infill including a first side and a second side; providing a lineal reinforcement to the cross-head die, the cross-head die configured to chemically and mechanically engage the lineal reinforcement to the geometric infill, via application of a polymer, whereby an output of the cross-head die is a component including the lineal reinforcement engaged to the first side of the geometric infill; and extruding or pultruding the component from the cross-head die.

12 Claims, 21 Drawing Sheets

(56) References Cited

U.S. PATENT DOCUMENTS

| | | | | |
|---|---|---|---|---|
| 2010/0080980 | A1* | 4/2010 | Maheshwari | B29D 99/0021 156/305 |
| 2010/0163167 | A1* | 7/2010 | Maheshwari | B29C 70/545 156/245 |
| 2010/0170637 | A1* | 7/2010 | Lannone | B29C 66/73773 156/276 |
| 2012/0067509 | A1* | 3/2012 | Kurtz | B29C 70/46 156/181 |
| 2013/0241100 | A1* | 9/2013 | Lownsdale | B29C 35/04 165/61 |
| 2016/0319171 | A1* | 11/2016 | Fornes | C09J 163/04 |
| 2019/0283361 | A1* | 9/2019 | Jia | B32B 5/024 |
| 2021/0239585 | A1* | 8/2021 | Hart | G01N 3/24 |
| 2023/0076283 | A1* | 3/2023 | Mueller | B29C 70/546 |
| 2023/0279916 | A1 | 9/2023 | Baur et al. | |
| 2024/0227372 | A1 | 7/2024 | Green | |
| 2024/0246284 | A1 | 7/2024 | Lewis et al. | |

* cited by examiner

POLYMERIC BASED MULTI-MATERIAL MULTI-LAYER GEOMETRICALLY ENHANCED STRUCTURAL COMPOSITIONS AND RELATED METHODS

CROSS-REFERENCE TO RELATED APPLICATIONS

This application claims the benefit of and priority to U.S. Provisional Patent Application 63/675,938, filed on Jul. 26, 2024, entitled Polymeric Based Multi-Material Multi-Layer Geometrically Enhanced Structural Compositions. This application is further related to, and incorporates by reference U.S. application Ser. No. 18/010,940, filed on Dec. 16, 2022, and entitled Multilayer Composite Strip for Increasing Rigidity.

FIELD

The present disclosure relates to reinforced polymeric based multi-material geometrically enhanced structural compositions and related methods. More particularly, to polymeric, multi-material, multi-layer, geometric infilled components and methods of making the same.

BACKGROUND

Structural compositions historically were comprised of single material extrusions through processes such as profile extrusion, or sheet/film extrusion. These extrusions were then advanced through the use of multiple composites, wherein the benefits of each composite were sought, while reducing the negatives. Advances continued in extrusion technology, including adding multiple layers, as well as adding foaming layers to assist in filling and reducing costs. Further, those foaming layer and multiple layers were key to adding insulating properties, and having the ability to incorporate a variety of features in a spatially oriented way.

On the structural side, extrusions gained the benefit of multiple materials, wherein metals and fibers were extruded with polymers to help with rigidity and fatigue issues. However, polymeric extrusions with metals suffer from binding and delamination, as well as the corrosive nature of certain metals. Fibers also suffer from environmental degradation, such as bast fibers, which can, if exposed to elements, weaken and decompose over time.

There is a long sought need to develop structural compositions that is both rigid, but also lightweight, and that said structural compositions would ultimately reduce material usage, while increasing strength and durability. Thus, the disclosure herein sets forth example systems and methods of making and applying a structural composition with an infill pattern for application into a variety of building materials, furniture, and goods.

SUMMARY

In some aspects, the techniques described herein relate to a method of forming a multi-material, multi-layer, geometric infilled component, including: applying an adhesive to a geometric infill; compressing the geometric infill with a lineal reinforcement on a first side and a second side of the geometric infill, wherein compressing adheres the lineal reinforcement to the first side and the second side of the geometric infill; providing the geometric infill with the lineal reinforcement on the first side and second side to a cross-head die; applying a polymer, via the cross-head die, whereby an output of the cross-head die is a component encased in a polymeric shell and including the lineal reinforcement engaged to the first side of the geometric infill; and extruding or pultruding the component from the cross-head die.

In some aspects, the techniques described herein relate to a method of forming a multi-material, multi-layer, geometric infilled component, including: applying an adhesive to a geometric infill; providing, to a cross-head die, the geometric infill having a lineal reinforcement along a first side of the geometric infill and an engagement member along a second side of the geometric infill; applying a polymer, via the cross-head die, whereby an output of the cross-head die is a component encased in a polymeric shell including: the lineal reinforcement engaged to the first side of the geometric infill; and the engagement member engaged to the second side of the geometric infill; and extruding or pultruding the component from the cross-head die.

In some aspects, the techniques described herein relate to a method of forming a multi-material, multi-layer, geometric infilled component, including: applying a polymeric film to a lineal reinforcement and a geometric infill; providing the geometric infill to a cross-head die, the geometric infill including a first side and a second side; providing the lineal reinforcement to the cross-head die; applying a polymer, via the cross-head die, to chemically and mechanically engage the lineal reinforcement to the geometric infill, whereby an output of the cross-head die is a component encased in a polymeric shell including the lineal reinforcement engaged to the first side of the geometric infill; and extruding or pultruding the component from the cross-head die.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DETAILED DESCRIPTION

Figure 1A:
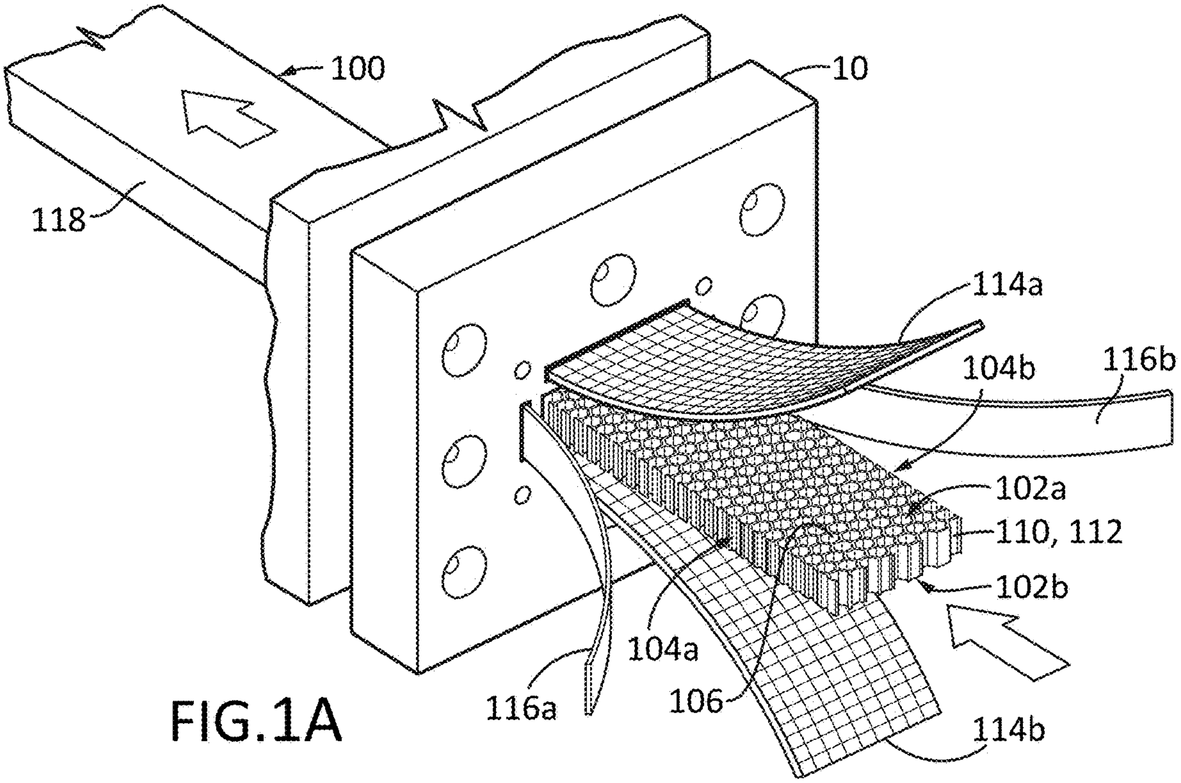
FIG. 1A is a perspective view of an illustration of an example of a multi-material, multi-layer, geometric infilled component being extruded or pultruded from a cross-head die, according to the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Reference is made to previously filed applications, including U.S. Pat. No. 9,981,411 entitled Structural Composition and Method; U.S. Pat. No. 10,343,313 entitled Structural Composition and Method; and International Publication Number WO 2024/049428. Each of which is hereby incorporated by reference.

"Component" as used herein include any lineal, extrusion, or object that is or is made up of multiple layer, multiple materials, and contains a reinforced geometric infill. Notably, in one aspect, components may also contain air voids or gaps, and the geometric infill is such a location of air voids and gaps.

"Polymeric" or "polymer" as used herein include any polymer capable of extrusion. Furthermore, in one aspect, the polymer may encompass additives and treatments, such as for UV protection, fire retardants, or for improving the consistency in the extrusion.

"Rigid composite reinforcement(s)" or "lineal reinforcements" as used herein include reinforcements manufactured through a process of heating and compressing, and may include physical and chemical bonding. This process was previously disclosed in the applications incorporated by reference herein; however, as a brief overview: the composite strip layers or composite reinforcements are fused or melted together with a first and second polymeric layers forming a "glue" substrate (binding agent) that penetrates a woven or non-woven and mixes with the composite layer to form a rigid structure. In some aspects a mesh layer may be introduced to further prevent lateral movement. The properties of the rigid composite reinforcement or lineal reinforcement as used herein allow for incorporation into a variety of building materials and products. Furthermore, in one aspect, because the layering of the composite strip may be adjusted, the relative stiffness and rigidity can be tuned to desired outcomes. Those outcomes may be further be effected by the polymer utilized as well as the fiber, such as a carbon fiber or glass fiber woven or non-woven. For instance, in one aspect, the incorporation of additional composite layers (polymer, carbon fiber, optionally mesh)

increases stiffness and/or rigidity, whereas, additional polymer layers may add more protective coatings, or allow for a larger layer height, depending on the applications.

"Geometric Infill" as used herein include any geometric pattern, matrix, framework, or scaffolding that may be used to fill a void, reduce material usage and weight, while also providing increased resistance to forces, and preventing sag or creep in the component. Example geometric infills according to the present disclosure include a grid layer of a crisscross pattern, a triangle pattern, a hexagon or honeycomb pattern that mimics structures in nature, a cubic pattern of 3D grid of cubes, a gyroid pattern or a complex and continuous pattern that benefits from efficient material usage, a concentric pattern of rings or shells, a zigzag pattern of back and forth lines, a voronoi pattern of irregular organic based cells, a rectilinear pattern of straight or parallel lines in alternating directions, an octet pattern of tetrahedral or octahedral, and many other patterns as will be recognized by those skilled in the art.

"Cross head-die" as used herein features in one aspect, a central mandrel or opening surrounded by an outer die to form a desired shape. The cross head-die allows for a material, such as a polymer, to flow around a component to form a desired shape. In one aspect, a cross head-die can be considered to apply a coating of polymer to a component that is fed into the central mandrel. In other aspects, a cross head-die allows for centralized flow to envelope a component, in other aspects it allows for multi-layer extrusion through co-extrusion, enabling the propagation of multiple layers simultaneously or though a series of cross head-dies.

Plastic or polymeric extrusion as used herein include a manufacturing process used to create a wide range of composite products by forcing molten plastic through a shaped die-head (e.g. a cross-head die). The main types of polymeric extrusion include: 1) profile extrusion which is used to create products with a consistent cross-section, such as pipes, tubing, and window frames, the plastic being forced through a die of the desired shape; 2) sheet/film extrusion which produces thin, flat plastic sheets or films, the molten plastic being extruded through a flat die and then passed through cooling rolls; 3) blown film extrusion which used to create thin plastic films, such as those used in plastic bags and packaging, the molten plastic being extruded through a circular die, and air being blown into the center of the extrusion to form a tube, which is then flattened into a film; 4) tubing extrusion which is similar to profile extrusion but specifically designed for producing hollow tubes and pipes including medical tubing, plumbing pipes, and drinking straws; 5) coextrusion which involves extruding multiple layers of material simultaneously and which is used to combine different materials or colors in a single product, such as multilayer films used in food packaging; 6) overjacketing extrusion which is used to apply a protective coating or layer over an existing product, such as wire and cable insulation, the plastic being extruded over the product to provide protection or insulation; 7) extrusion blow molding which combines extrusion with blow molding and whereby a parison (a tube of molten plastic) is extruded and then blown into a mold to form hollow products like bottles and containers; and 8) pultrusion which although slightly different, is related to extrusion and involves pulling fibers through a resin or polymer bath (e.g., to apply a polymeric film) and then through a heated die to create reinforced polymeric products.

For example, in one aspect, it is contemplated that polyethylene, polypropylene, polyvinyl chloride, polystyrene, polyethylene terephthalate, polytetrafluoroethylene, polycarbonate, polyamide, polymethyl methacrylate, polyurethane, polybutadiene, polylactic acid, polyvinyl alcohol, polyether ketone, polychloroprene, and polypropylene glycol are all applicable to varying degrees with the disclosure herein. In another aspect, the components and sub-components according to the present disclosure may be made of recycled materials or may incorporate internal reinforcement such as embedded reinforcement fibers as is understood in the art or multilayer composite strips according to the present disclosure. The components or sub-components, in another aspect, may be formed of "color-blend" recycled plastics or polymers as is known in the art. The components and sub-components, in another aspect, may be formed of scrap carbon fiber, and fiber glass and glass fibers, as well as any other polymers and/or any other natural (e.g., plant-based or plant derived) or non-natural fiber(s).

For example, in another aspect, polymeric materials disclosed for various applications herein include:

| Polymeric Material | Properties |
|---|---|
| Low-density polyethylene (LDPE) | Chemically inert, flexible, insulator |
| High-density polyethylene (HDPE) | Inert, thermally stable, tough and high tensile strength |
| Polypropylene | Resistant to acids and alkalies, high tensile strength |
| Polyvinyl chloride (PVC) | Insulator, flame retardant, chemically inert |
| Polychlorotrifluoroethylene (PCTFE) | Stable to heat and thermal, high tensile strength and non-wetting |
| Polyamide (Nylon) | High melting point, excellent abrasion resistance |
| Polyethylene terephthalate (PET) & (PETG) | High strength and stiffness, broad range of use temperatures, low gas permeability |

Continuing, in another aspect, the geometric infill layer is often pre-coated or otherwise integrated with a polymeric film to allow for chemical and mechanical binding with the form layer. Similarly, the rigid composite layer may also be coated with a polymer film, or a polymer and additives that have affinity to or like properties to allow the chemical and mechanical bonding of the elements. It has been found that each layer would not bond sufficiently unless specific properties were involved to allow for both a chemical and a mechanical bond. Thus, like polymers often bind with like polymers, and the multiple layers are sometimes coated or applied with like polymers to allow for bonding. Therefore, a binding agent may be applied to each layer that allows for chemical and mechanical bonding.

Furthermore, in one aspect, the composite strip layer may be sheets of polymeric material and chopped carbon fiber, wherein the sheets are then heated and compressed to form the composite strip. Thus, a mesh layer is not contemplated in this embodiment, and such process may maintain the lateral restraint in the manufacturing process by interlocking the chipped carbon fiber and polymer to form a mat like structure that in and of itself will resist pulling when entering the rollers for the heating, compressing, and cooling process.

In one aspect, a non-woven may be applied as a rigid composite strip. For example, an airlay machine may apply a non-woven carbon fiber mat or fiber glass mat or sheet, in which the polymeric layer then coats. In this aspect, a rigid composite strip is formed by dispersing a first polymeric layer, such as a polymeric sheet or polymeric granules, and melting said sheet or granules. Next, applying the non-woven layer, and melting or chemically and physically integrating the polymer granules or sheet to the non-woven.

Together the polymeric layer and the non-woven layer for a composite strip. In some aspect a mesh layer, it may be rolled onto, placed, heated, cooled, and/or pressed onto the polymeric layer so that the polymeric layer fuses with the mesh layer forming a binder for receiving a composite layer. This fusion may be chemical or mechanical, and may involve pressing, rolling, heating, cooling, and other mechanical or chemical engagement as may be necessary. Further, in additional aspects, the mesh layer may not be applied, and the carrier is formed from the melting of polymeric granules to a non-woven or woven mat, comprising carbon fiber, bast, or fiberglass.

Next, in one aspect, the carrier layer, including the polymeric layer, and optionally the mesh layer, have a layer of shredded fibrous material and polymeric powder added by either dispersing, dropping, adhering, spreading, dusting, or placing onto the first carrier. Wherein the second carrier may then be rolled on top of the composite layer, forming a sandwich. In one aspect, the first mesh layer and the first polymeric layer are melted with the composite layer, thus the PET from the carrier layer and the composite layer are fused together. Turning to the composite layer, wherein depositing the shredded fibrous material and the pelletized polymeric material, the layer is conducted by placing each of said materials through a shaker or sorter onto the carrier. The carrier (first polymeric layer and first mesh layer), then integrates and binds to the previous layers through a mechanical or chemical process. To finish the example rigid composite strip, a second carrier, similar to the first, is applied to the first carrier and the composite layer. This process of layering may include additional composite layers, (optionally) mesh layers, or polymeric layers, depending upon the application and rigidity required. The layers may also be made up of different materials, for example, a first carrier may have a fiberglass mesh, and a second carrier may have a steel mesh or a nylon mesh. Further, certain machine apparatuses are limited by the overall layer height, thus the multilayer composite may be re-melted and applied or stacked, and may be made up of several multilayer composite strips "baked" together to form larger rigid structures.

Moreover, in one aspect, the disclosure herein provides that rigidity may be increased by increasing the number of rigid composite layers. The rigid composite layer provides for resistance in all directions, and shows strong resistance to lateral forces.

Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

I. Example Use Case

The structural compositions described herein, and the related systems and methods, present a novel approach and one or more technical steps and/or solutions to addressing the challenges and deficiencies in the prior art.

For example, in one aspect, the systems and methods according to the present disclosure leverage a multi-material, multi-layer, geometric infilled component, having: a rigid composite reinforcement including a non-woven or woven polymeric material with carbon fiber; a geometric infill defined by a geometric infill pattern or scaffold of lightweight material; an optional engagement member; a polymeric shell or polymeric form encasing the rigid composite reinforcement, the optional engagement member, and the geometric infill; and a polymeric film on the rigid composite reinforcement, the optional engagement member, and the geometric infill to chemically and mechanically engage the component.

In another aspect, systems and methods according to the present disclosure have a variety of uses. In one aspect, the disclosure herein provides for use of recycled polymers to create functional, reduced weight, strong, and anti-corrosive components for a wide variety of applications. In another aspect, the disclosure herein may be used to assemble decking, and flooring, and may be the basis for structures such as at outdoor venues, or near bodies of water. In another aspect, the geometric infill may be comprised of wood pulp and paper, such as DuPont Nomex™ paper, or other wood pulp or paper, and may be fully sealed by the polymer form factor; as such, there is little risk of environmental exposure to the geometric infill. In another aspect, applications include windows/doors components, as well as louvers and other window treatments. In another aspect, household form factors that could benefit from the disclosure herein include framing, shelving, fan blades, window shelves, to name a few.

In another aspect, systems and methods according to the present disclosure provide for use in applications that require strength without sacrificing reduced weight. Thus, in one aspect, the disclosure herein may be particularly suited for marine and aeronautical use, and many be shaped to any number of form factors to apply to such environments. In particular, in another aspect, the disclosure herein may be particularly suited for building materials such as flooring, walls, framing, or exterior surfaces, as well as components to vehicles, and other objects that may require strength and resilience to environmental degradation. In such strength situations, the geometric infill may comprise a metal, such as aluminum, or for increased strength a steel geometric infill may be utilized.

In another aspect, systems and methods according to the present disclosure provide for increasing resistance to both horizontal and vertical forces. In one aspect, the geometric infill engaged to the rigid composite reinforcement perform exceptionally well against forces pulling and pushing the component along a lateral line, as well as weight forces downward or upward onto the component. The geometric infill, in one aspect, may often be selected for such force resistance, as well as for other properties such as sound dampening, reduction of weight, fire retardant properties, impact resistance properties against projectiles, and many other applications as disclosed herein. Further, the geometric infill layer with the rigid composite layer allows for incorporation into various component shapes, and provides for an encased component that may be adapted with different infill patterns and materials to serve the need of the application.

In another aspect, systems and methods according to the present disclosure leverage a geometric infill having at least one or more sides, face, or surfaces, e.g., a first side, a second a third side, a fourth side, etc. Moreover, in one aspect, a geometric infill according to the present disclosure has a profile end. Moreover, in another aspect, a geometric infill has a profile end defined by a geometric pattern. Moreover, in another aspect, a geometric infill is made up of a plurality of side-by-side polyhedral prisms which, when looked at from the profile end, define the geometric pattern. Furthermore, in another aspect, a geometric infill (to be presented to the cross-head die) is an intermediate product resulting from, first, a pultrusion or extrusion process and then from a subsequent processing step that results in an intermediate geometric infill having a profile side and a lateral side. Furthermore, in another aspect, the primary geometric infill may have an extrusion or pultrusion length and the intermediate infill may be processed such that it defines a longitudinal axis that is angled or perpendicular to the extrusion or pultrusion length of the original primary geometric infill (from which the intermediate infill came).

In another aspect, systems and methods according to the present disclosure leverage a lineal reinforcement. In particular, in one aspect, a lineal reinforcement is made up of a non-woven or woven composite strip including carbon fiber.

In another aspect, systems and methods according to the present disclosure leverage an engagement lineal, sheet, or broadly, member. In particular, in one aspect, the engagement member is the same material and make up as the lineal reinforcement but thinner. In another aspect, the engagement member is a different material and/or make up as the lineal reinforcement. In another aspect, the engagement member is a polymer. In another aspect, the engagement member is a product of a method involving an airlay system step. In another aspect, the engagement member may be any material that allows for a fastener, such as a nail or screw, to have an anchor substrate, within the component, upon which to engage/grab.

In another aspect, systems and methods according to the present disclosure leverage a cross-head die configured to chemically and mechanically engage a lineal reinforcement and/or an engagement member (or any other sub-component) to a geometric infill, via application of heat and/or a polymer. In one aspect, the cross-head die is configured to heat-active an adhesive and/or to dry, harden, and/or cure a polymer. Further adhesives or additives are compatible with the outer surface of the facing/exterior sides of a component.

In another aspect, systems and methods according to the present disclosure provide for a method of forming a multi-material, multi-layer, geometric infilled component or structural composite. In one aspect, a method step involves providing a geometric infill, lineal reinforcement, and/or an engagement member to a cross-head die. In particular, in one aspect, the method step involves providing the geometric infill to a corresponding slot in a cross-head die, providing the lineal reinforcement to a corresponding slot in the cross-head die, and/or providing the engagement member to a corresponding slot the cross-head die. In another aspect, the cross-head die is configured to receive multiple lineal reinforcements and/or multiple engagement members (as well as various other optional or elective sub-components) at once (each with its own corresponding slot(s)). In another aspect, the cross-head die is configured to receive the geometric infill(s), one or more lineal reinforcements, and/or one or more engagement members (as well as various other optional or elective sub-components) into one slot (in which case, the inputs are pre-processed, engaged, and/or adhered prior to providing the geometric infill, lineal reinforcement, and/or the engagement member to a cross-head die).

In another aspect, a method step according to the present disclosure involves outputting, from a cross-head die, a component comprising the lineal reinforcement engaged to the first side of the geometric infill. In particular, in one aspect, the method step involves extruding or pultruding the component from the cross-head die.

In another aspect, a method step according to the present disclosure involves applying a polymer, via a cross-head die, to chemically and mechanically engage a lineal reinforcement to a geometric infill. In particular, in one aspect, an output of the cross-head die is a component comprising the lineal reinforcement engaged to a side of the geometric infill, e.g., a first side. In another aspect, an output of the cross-head die is a component comprising the lineal reinforcement engaged to the first side of the geometric infill, and the engagement member engaged to the second side of the geometric infill.

In another aspect, a method step according to the present disclosure involves encasing the sub-components of the components according to the present disclosure in a polymeric shell and extruding or pultruding the encased final output from the cross-head die.

In another aspect, a method step according to the present disclosure involves applying a polymeric film to a lineal reinforcement(s), a geometric infill(s), and an engagement member(s) prior to providing the geometric infill to a cross-head die. In another aspect, applying the polymeric film or treatment is a pre-treatment to further downstream polymer applications.

In another aspect, a method step according to the present disclosure involves applying a heat-activated adhesive (in other aspects it may be a physically activated, or chemically activated adhesive) to a geometric infill(s) prior to providing the geometric infill to a cross-head die. In another aspect, in particular, a method step involves applying a heat-activated adhesive to a geometric infill and then providing, to a cross-head die, the geometric infill having a lineal reinforcement along a first side of the geometric infill and an engagement member along a second side of the geometric infill. As such, in another aspect, applying the heat-activated adhesive or treatment is a pre-treatment to further downstream polymer applications.

In another aspect, a method step according to the present disclosure involves extruding or pultruding a geometric infill and then processing the geometric infill to yield an intermediate infill and then providing the intermediate infill to a cross-head die, whereby an output of the cross-head die is a component encased in a polymeric shell comprising the lineal reinforcement engaged to the profile side of the intermediate infill; and extruding or pultruding the component from the cross-head die.

In another aspect, a method step according to the present disclosure involves extruding or pultruding a geometric infill having an extrusion or pultrusion length, the geometric infill comprising a plurality of side-by-side polyhedral prisms and a profile end; and processing the geometric infill to yield an intermediate infill comprising a profile side and a lateral side, such that the intermediate infill defines a longitudinal axis that is angled or perpendicular to the extrusion or pultrusion length, and such that an output of the cross-head die is a component encased in a polymeric shell comprising the lineal reinforcement engaged to the profile side of the intermediate infill. In particular, in one aspect, a method step according to the present disclosure involves providing the intermediate infill to the cross-head die in an orientation that aligns the longitudinal axis with an extrusion or pultrusion direction through the cross-head die.

In another aspect, a method step according to the present disclosure involves providing a geometric infill to a cross-head die, the geometric infill comprising a first side, a second side, and a plurality of side-by-side polyhedral prisms; providing a lineal reinforcement and an engagement member to the cross-head die, whereby an output of the cross-head die is a component encased in a polymeric shell comprising: the lineal reinforcement engaged to the first side of the geometric infill; and the engagement member engaged to the second side of the geometric infill; and extruding or pultruding the component from the cross-head die.

In another aspect, a method step according to the present disclosure involves providing an extruded or pultruded lineal reinforcement and an extruded or pultruded geometric infill directly and in continuous manufacturing fashion to a cross-head die.

II. Systems and Methods

In one aspect, the present disclosure provides a reinforced polymeric based multi-material geometrically enhanced structural compositions and related methods.

In one aspect, the present disclosure provides a polymeric, multi-material, multi-layer, geometric infilled components and methods of making the same.

In one aspect, the present disclosure provides a method of forming a multi-material, multi-layer, geometric infilled component, the method having the steps of: providing a geometric infill to a cross-head die, the geometric infill comprising a first side and a second side; providing a lineal reinforcement to the cross-head die, the cross-head die configured to chemically and mechanically engage the lineal reinforcement to the geometric infill, via application of a polymer, whereby an output of the cross-head die is a component comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: providing a geometric infill to a cross-head die, the geometric infill comprising a first side and a second side; providing a lineal reinforcement to the cross-head die; applying a polymer, via the cross-head die, to chemically and mechanically engage the lineal reinforcement to the geometric infill, whereby an output of the cross-head die is a component comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: providing a geometric infill to a cross-head die, the geometric infill comprising a first side and a second side; providing a lineal reinforcement to the cross-head die; applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: providing a geometric infill to a cross-head die, the geometric infill comprising a first side and a second side; providing a lineal reinforcement and an engagement member to the cross-head die; applying a polymer, via the cross-head die, to chemically and mechanically engage the lineal reinforcement and the engagement member to the geometric infill, whereby an output of the cross-head die is a component encased in a polymeric shell comprising: the lineal reinforcement engaged to the first side of the geometric infill; and the engagement member engaged to the second side of the geometric infill; and extruding or pultruding the component from the cross-head die.

In one aspect, the present disclosure provides a method of forming a multi-material, multi-layer, geometric infilled component, the method having the steps of: applying a heat-activated adhesive to a geometric infill; providing, to a cross-head die, the geometric infill having a lineal reinforcement along a first side of the geometric infill and an engagement member along a second side of the geometric infill; applying heat and a polymer, via the cross-head die, to chemically and mechanically engage the lineal reinforcement and the engagement member to the geometric infill, whereby an output of the cross-head die is a component encased in a polymeric shell including: the lineal reinforcement engaged to the first side of the geometric infill; and the engagement member engaged to the second side of the geometric infill; and extruding or pultruding the component from the cross-head die In one aspect, the present disclosure provides a method of forming a multi-material, multi-layer, geometric infilled component, the method having the steps of: applying a polymeric film to a lineal reinforcement and a geometric infill; providing the geometric infill to a cross-head die, the geometric infill comprising a first side and a second side; providing the lineal reinforcement to the cross-head die; applying a polymer, via the cross-head die, to chemically and mechanically engage the lineal reinforcement to the geometric infill, whereby an output of the cross-head die is a component encased in a polymeric shell comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: applying a polymeric film to a non-woven or woven composite strip including carbon fiber for insertion into a cross-head die, whereby a lineal reinforcement results comprising the non-woven or woven composite strip and carbon fiber; applying the polymeric film to a geometric infill for insertion into the cross-head die, the geometric infill comprising a first side and a second side; providing the non-woven or woven composite strip including carbon fiber and the geometric infill to the cross-head die; applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: extruding or pultruding a geometric infill comprising a profile end; processing the geometric infill to yield an intermediate infill comprising a profile side and a lateral side; providing a lineal reinforcement to a cross-head die; providing the intermediate infill to the cross-head die; applying a polymer, via the cross-head die, to chemically and mechanically engage the lineal reinforcement to the intermediate infill, whereby an output of the cross-head die is a component encased in a polymeric shell comprising the lineal reinforcement engaged to the profile side of the intermediate infill; and extruding or pultruding the component from the cross-head die.

In one aspect, the present disclosure provides a method of forming a multi-material, multi-layer, geometric infilled component, the method having the steps of: providing a geometric infill to a cross-head die, the geometric infill comprising a first side, a second side, and a plurality of side-by-side polyhedral prisms; providing a lineal reinforcement to the cross-head die; applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill; and extruding or pultruding the component from the cross-head die.

In one aspect, the present disclosure provides a method of forming a multi-material, multi-layer, geometric infilled component, the method having the steps of: extruding or pultruding a geometric infill having extrusion or pultrusion length, the geometric infill comprising a plurality of side-by-side polyhedral prisms and a profile end; processing the geometric infill to yield an intermediate infill comprising a profile side and a lateral side, the intermediate infill defining a longitudinal axis that is angled or perpendicular to the extrusion or pultrusion length; providing a lineal reinforcement to a cross-head die; providing the intermediate infill to the cross-head die; applying a polymer, via the cross-head die, to chemically and mechanically engage the lineal reinforcement to the intermediate infill, whereby an output of the cross-head die is a component encased in a polymeric shell comprising the lineal reinforcement engaged to the profile side of the intermediate infill; and extruding or pultruding the component from the cross-head die.

In one aspect, the present disclosure provides a method of forming a multi-material, multi-layer, geometric infilled component, the method having the steps of: providing a geometric infill to a cross-head die, the geometric infill comprising a first side, a second side, and a plurality of side-by-side polyhedral prisms; providing a lineal reinforcement and an engagement member to the cross-head die; applying a polymer, via the cross-head die, to chemically and mechanically engage the lineal reinforcement and the engagement member to the geometric infill, whereby an output of the cross-head die is a component encased in a polymeric shell comprising: the lineal reinforcement engaged to the first side of the geometric infill; and the engagement member engaged to the second side of the geometric infill; and extruding or pultruding the component from the cross-head die.

In one aspect, the present disclosure provides a method of forming a multi-material, multi-layer, geometric infilled component, the method having the steps of: extruding or pultruding a geometric infill having an extrusion or pultrusion length, the geometric infill comprising a plurality of side-by-side polyhedral prisms and a profile end; processing the geometric infill to yield an intermediate infill comprising a profile side and a lateral side, the intermediate infill defining a longitudinal axis that is angled or perpendicular to the extrusion or pultrusion length; providing a lineal reinforcement and an engagement member to a cross-head die; providing the intermediate infill to the cross-head die in an orientation that aligns the longitudinal axis with an extrusion or pultrusion direction through the cross-head die; applying a polymer, via the cross-head die, to chemically and mechanically engage the lineal reinforcement and the engagement member to the intermediate infill, whereby an output of the cross-head die is a component encased in a polymeric shell comprising: the lineal reinforcement engaged to the profile side of the intermediate infill; and the engagement member engaged to the lateral side of the intermediate infill; and extruding or pultruding the component from the cross-head die.

In one aspect, the present disclosure provides a method of forming a multi-material, multi-layer, geometric infilled component, the method having the steps of: extruding or pultruding a geometric infill comprising a profile end and a side; providing a lineal reinforcement and the extruded or pultruded geometric infill to a cross-head die; applying a polymer, via the cross-head die, to chemically and mechanically engage the lineal reinforcement and the extruded or pultruded geometric infill, whereby an output of the cross-head die is a component encased in a polymeric shell and comprising the lineal reinforcement engaged to the side of the geometric infill; and extruding or pultruding the component from the cross-head die.

III. With Reference to the Figures

Figure 1B:
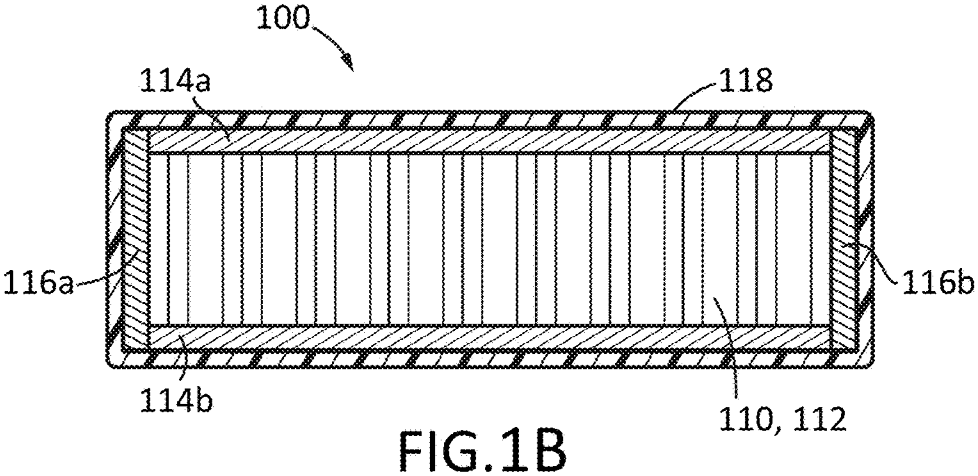
FIG. 1B is an elevation view of an illustration of an example cross section of the multi-material, multi-layer, geometric infilled component of FIG. 1A.
Figure 1C:
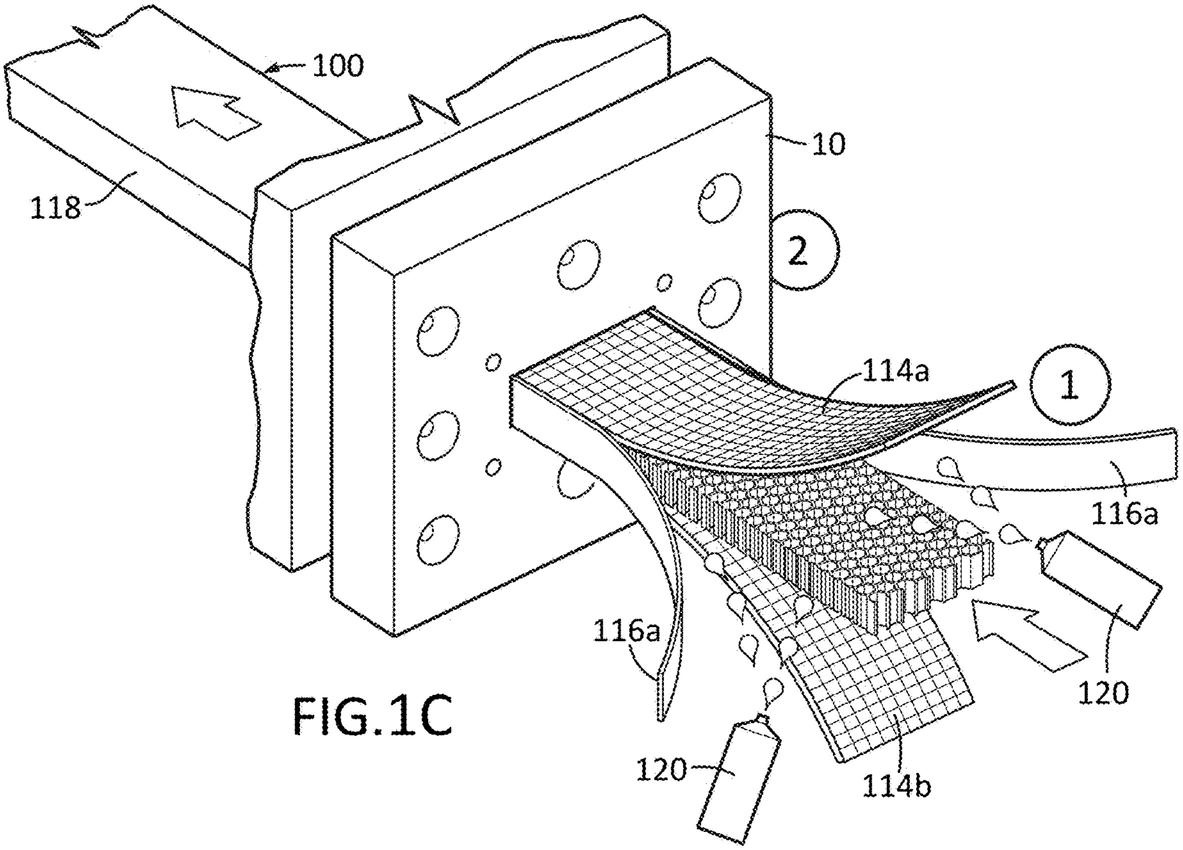
FIG. 1C is a perspective view of an illustration of an example of a variation of the extrusion or pultrusion process of FIG. 1A.
Figure 1D:
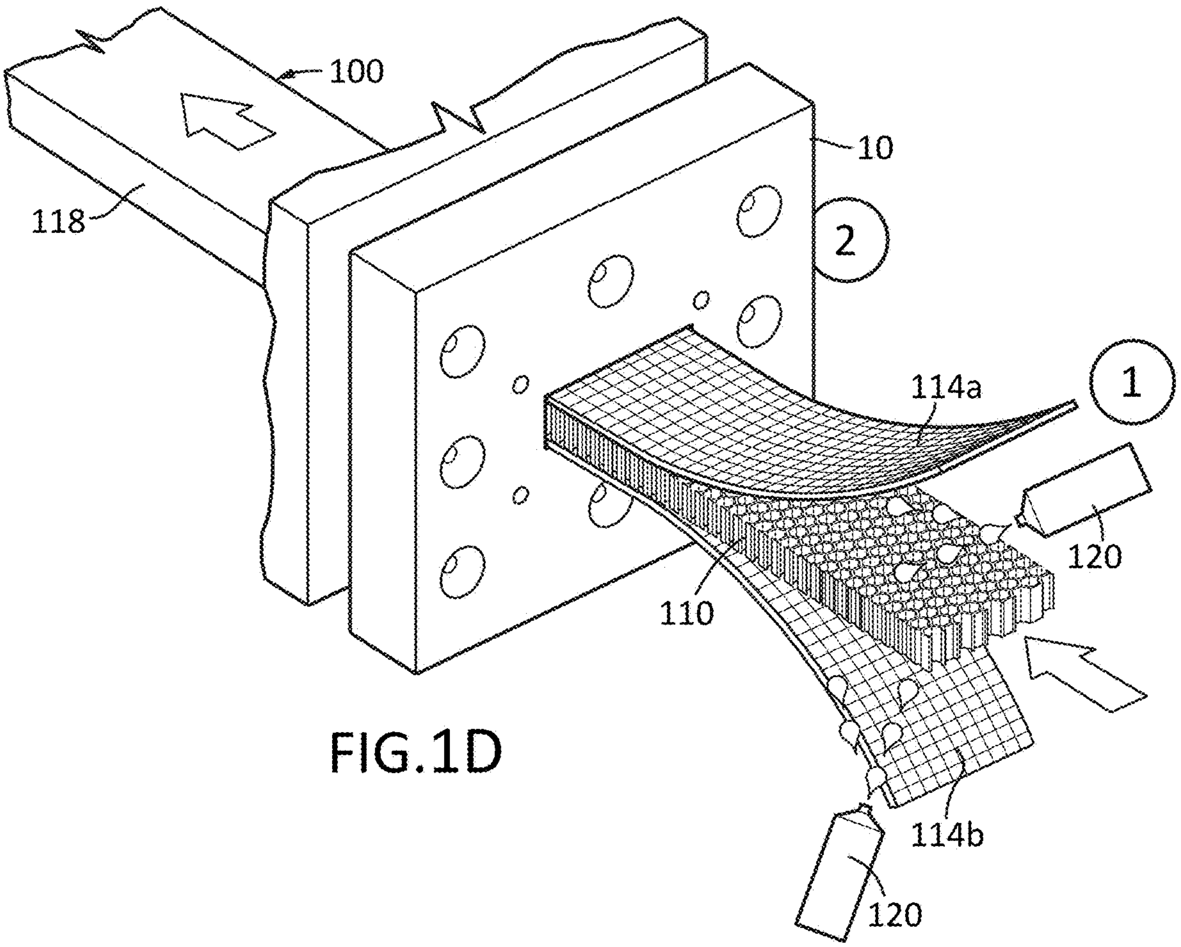
FIG. 1D is a perspective view of an illustration of another example of a variation of the extrusion or pultrusion process of FIG. 1A
Figure 1E:
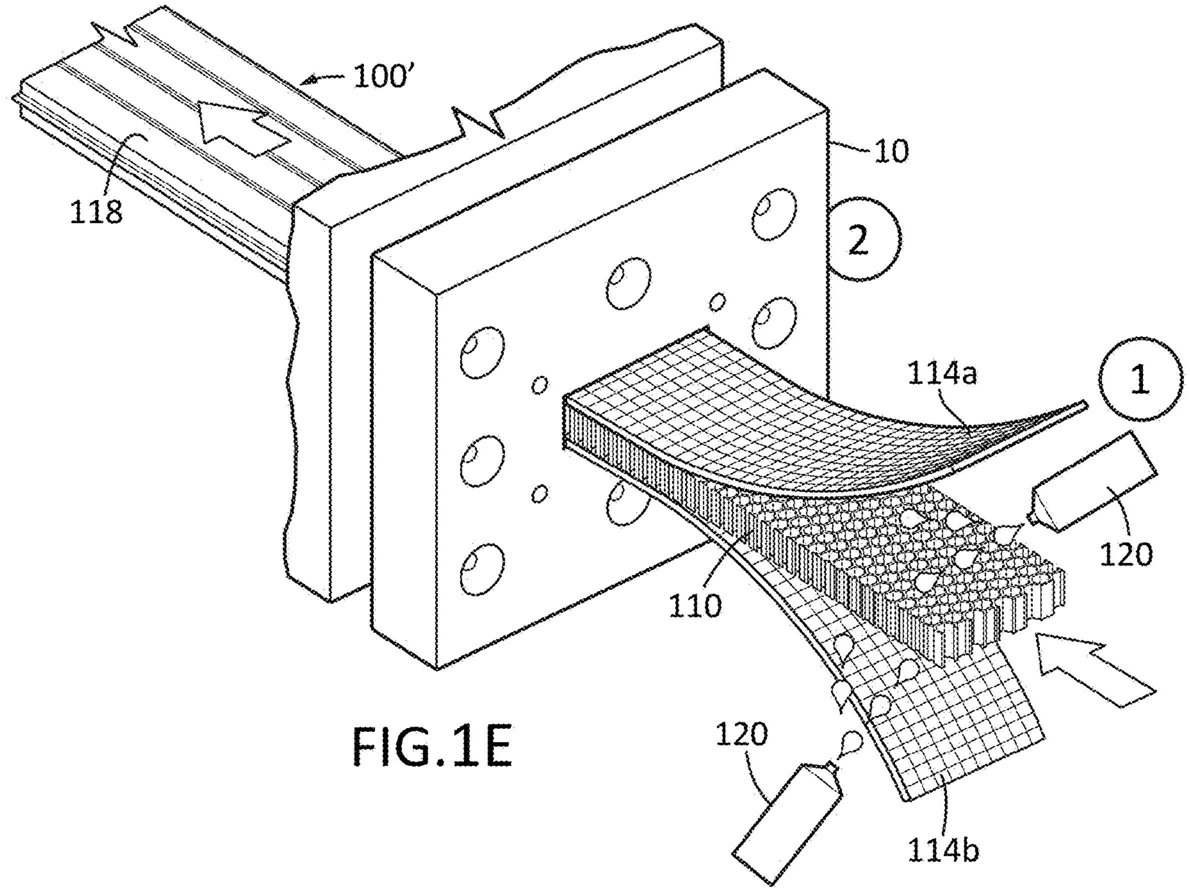
FIG. 1E is a perspective view on an illustration of another example of a variation of the extrusion or pultrusion process of FIG. 1A producing a deck board.

FIG. 1A is a perspective view of an illustration of an example of a multi-material, multi-layer, geometric infilled component being extruded or pultruded from a cross-head die, according to the present disclosure; FIG. 1B is an elevation view of an illustration of an example cross section of the multi-material, multi-layer, geometric infilled component of FIG. 1A; FIG. 1C is a perspective view of an illustration of an example of a variation of the extrusion or pultrusion process of FIG. 1A; FIG. 1D is a perspective view of an illustration of another example of a variation of the extrusion or pultrusion process of FIG. 1A; and FIG. 1E is a perspective view on an illustration of another example of a variation of the extrusion or pultrusion process of FIG. 1A, but yielding a specific component, namely, a deck board component. In particular, in another aspect, the cross-head die 10 is used to yield the component 100. FIGS. 1A-1E are not illustrated to scale and are not limited to the dimensions or relative proportions as shown.

In another aspect, as illustrated in FIGS. 1A-1E, the component 100 extruded or pultruded from the cross-head die 10 has a geometric infill(s) 110, lineal reinforcement(s) 114, and engagement member(s) 116. In particular, in one aspect, the geometric infill 110 presented to the cross-head die 10 is an intermediate product 112, such as DuPont Nomex™ paper or a similarly structured PET product, resulting from an earlier method or process (not illustrated). Moreover, in another one, the geometric infill 110 is made up of a plurality of side-by-side polyhedral prisms 106 each comprising an n-sided polygon opening and a lateral face (specifically, a hexagon opening as illustrated), and the geometric infill 110 has a profile side(s) 102, and lateral side(s) 104.

In another aspect, as illustrated in FIGS. 1A-1E, the cross-head die 10 is configured to chemically and mechanically engage the lineal reinforcements 114 and the engagement members 116 to the geometric infill 110, via application of a polymer, such that the component 100 is encased in a polymeric shell 118 comprising the lineal reinforcements **114*a* engaged to the profile side 102*a*, the lineal reinforcement 114*b* engaged to the profile side 102*b*, the engagement member 116*a* engaged to the lateral side 104*a*, and the engagement member 116*b* engaged to the lateral side 104*b*, of the geometric infill 110**.

In another aspect, as illustrated in FIGS. 1C-1E, the extrusion or pultrusion process is a two stage process that is shown together in the figure(s) for simplicity and convenience. At stage 1 (the upstream stage), the extrusion or pultrusion process involves applying an adhesive, in one example a heat-activated adhesive 120 to a geometric infill(s) 110 prior to providing the geometric infill(s) 110 to the cross-head die 10. In this step the geometric infill is coated, sprayed, or applied with an adhesive, such as a glue, that in part will mechanically and chemically bond the geometric infill with the lineal reinforcement. In one aspect, the extrusion or pultrusion process involves applying the heat-activated adhesive 120 to the geometric infill 110 and applying rollers or other mechanical pressure to increase binding, and then, at stage 2 (the downstream stage), providing to a cross-head die 10 the geometric infill 110 having a lineal reinforcement 114 along a first side of the geometric infill 110 and/or an engagement member 116 along a second side of the geometric infill 110. Thus, the geometric infill and lineal reinforcements are coated or subjected to and encased by a polymeric composition, in doing so heat may be applied from the residual heat of the polymer and further increased the bonding of the adhesive between the geometric infill and the lineal reinforcement.

In another aspect, as illustrated in FIG. 1A, the cross-head die 10 is further configured to receive the geometric infill(s) 110, one or more lineal reinforcements 114, and/or one or more engagement members 116 (as well as various other optional or elective sub-components) into corresponding slots of the cross-head die 10 (i.e., into a corresponding slot for each type of input).

In another aspect, as illustrated in FIG. 1C, the cross-head die 10 is further configured to receive the geometric infill(s) 110, one or more lineal reinforcements 114, and/or one or more engagement members 116 (as well as various other optional or elective sub-components) into one individual slot of the cross-head die 10 (i.e., each type of input into one individual slot).

In another aspect, as illustrated in FIG. 1D, the cross-head die 10 is further configured to receive the geometric infill(s) 110 and one or more lineal reinforcements 114 into one individual slot of the cross-head die 10 (i.e., each type of input into one individual slot).

In another aspect, as illustrated in FIG. 1E, the component 100' is an extruded or pultruded deck board comprising a geometric infill(s) 110, lineal reinforcement(s) 114, and a polymeric shell 118.

In all aspects, a surface additive may be introduced, this additive may be placed directly on the component, such as the geometric infill, or may be soaked, sprayed, or otherwise transferred into the surface. Additives may include surface additives to increase bonding, such as calcium carbonate, other additives such as slip agents may be used to aid in the extrusion or pultrusion process, antistatic agents may be added to reduced electric build-up during the extrusion or pultrusion process, acrylic or maleic acid copolymers may be added to enhance melt strength and improve dispersion. Additional additives include flame retardants such as brominated or phosphorous based materials. Surface additives may additionally include colorants or pigments, which may be used for particular applications or to aid when using recycled components to improve the image and consistency of the component. Additionally, impact modifiers may be introduced, in particular to the composite strip, reinforcement lineal, or other areas that may see impact and have largely a polymeric composition. Lastly, antioxidants may be applied to polymeric compositions to reduce degradation from heat, light, and oxygen. All of these surface additives may be combined at the first step of adhering the lineal reinforcements to the geometric infill, or may be applied at or during the cross-head die process.

Figure 2A:
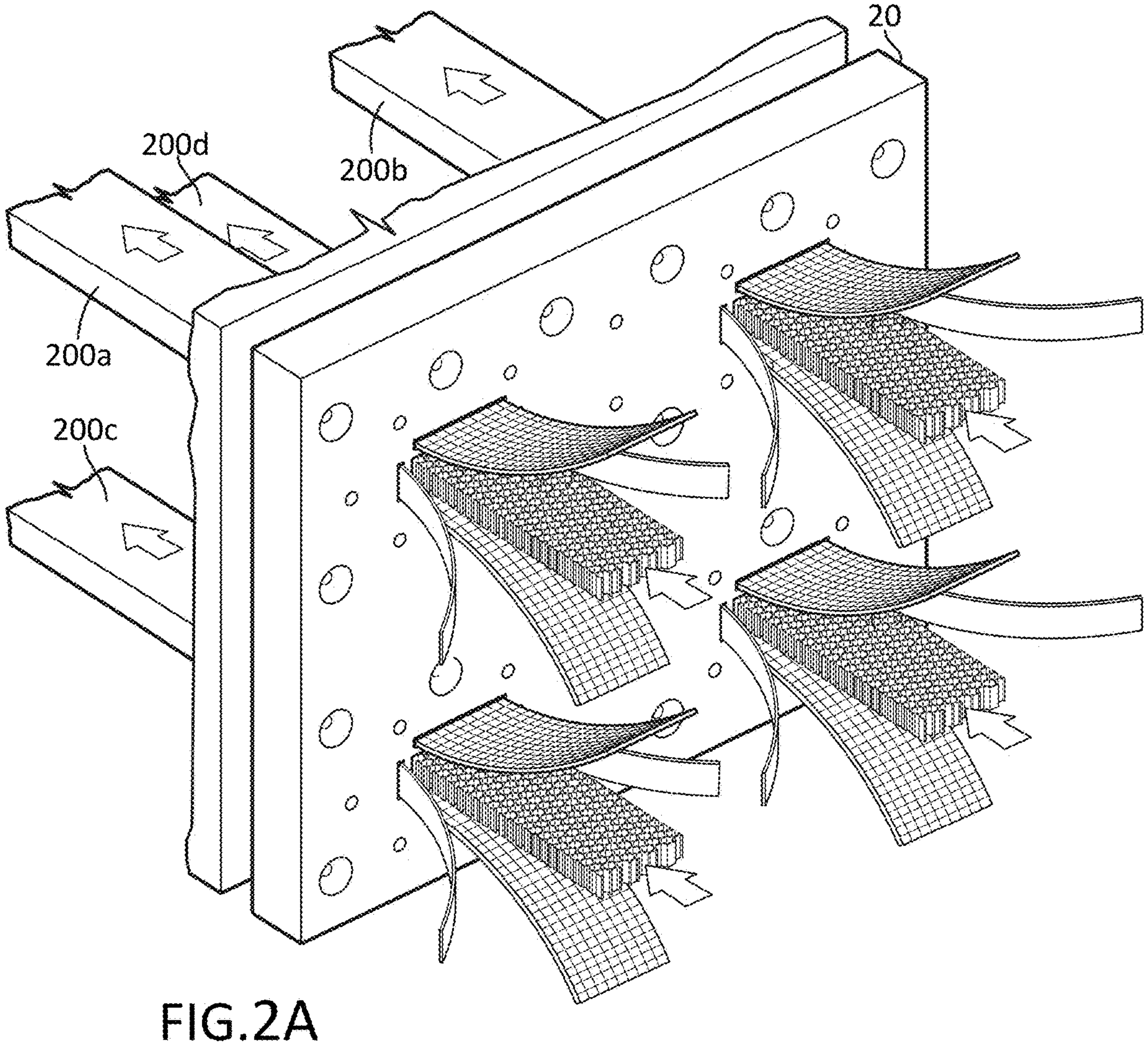
FIG. 2A is a perspective view of an illustration of an example of four (4) multi-material, multi-layer, geometric infilled components being extruded or pultruded from a cross-head die, according to the present disclosure.
Figure 2B:
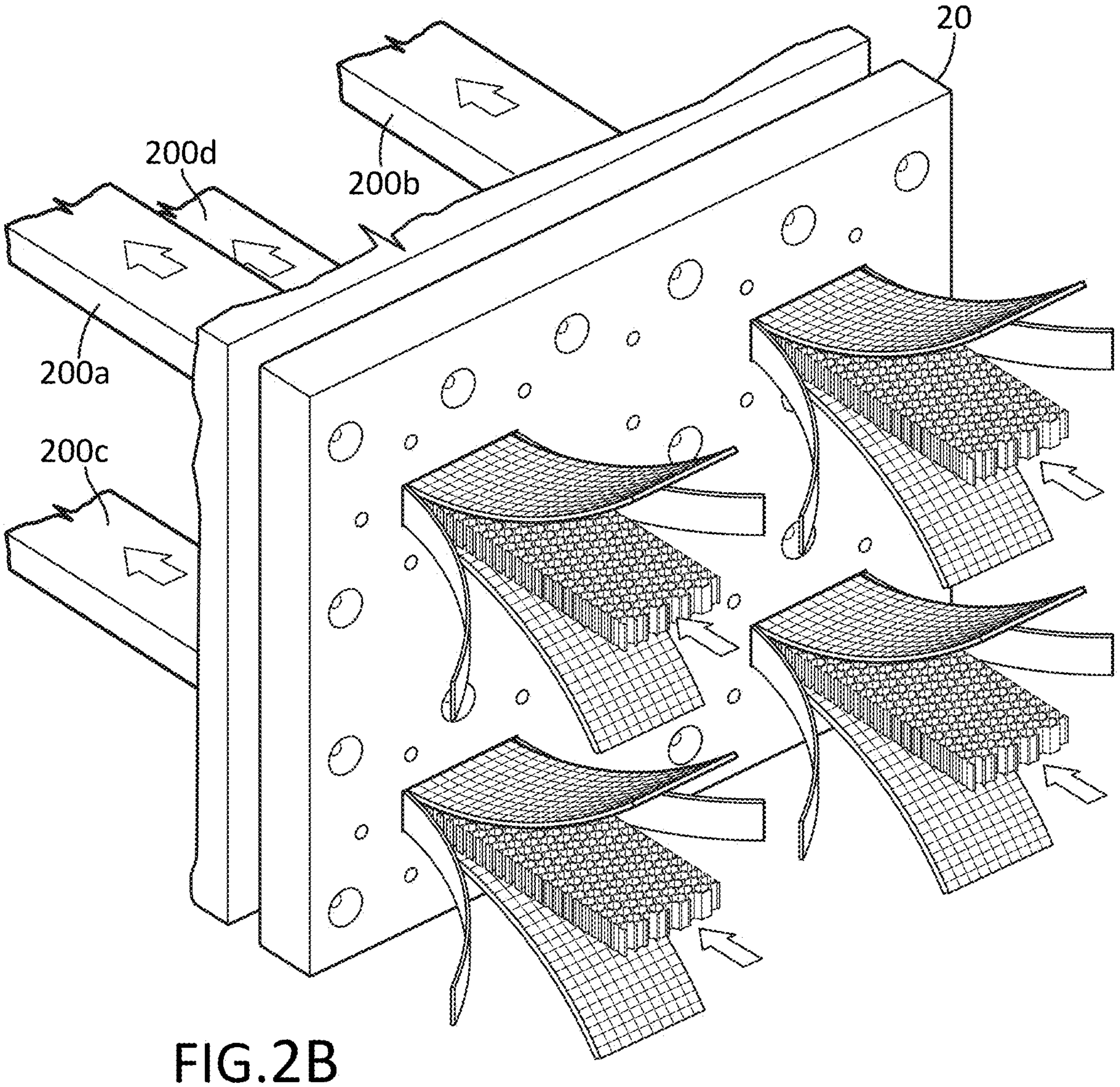
FIG. 2B a perspective view of an illustration of an example of a variation of the extrusion or pultrusion process of FIG. 2A.

Turning now to FIGS. 2, FIG. 2A is a perspective view of an illustration of an example of four (4) multi-material, multi-layer, geometric infilled components being extruded or pultruded from a cross-head die, according to the present disclosure; and FIG. 2B a perspective view of an illustration of an example of a variation of the extrusion or pultrusion process of FIG. 2A. In particular, in one aspect, the cross-head die 20 is used to yield four (4) separate components 200, namely, component 200*a*, component 200*b*, component 200*c*, and component 200*d*. FIGS. 2A-2B are not illustrated to scale and are not limited to the dimensions or relative proportions as shown.

In another aspect, as illustrated in FIG. 2A, the cross-head die 20 is further configured to receive the inputs into corresponding slots of the cross-head die 20 (i.e., into a corresponding slot for each type of input).

In another aspect, as illustrated in FIG. 2B, the cross-head die 20 is further configured to receive each major input into one individual slot of the cross-head die 20 (i.e., each type of input into one individual slot). In one aspect, the cross-head die 20 has other optional slots for receiving various other optional or elective sub-components or inputs. In another aspect, similar to what is shown in FIGS. 1C-1E, the major inputs may be pre-processed prior to being presented to the cross-head die 20 such that they can be more readily and/or continuously received (i.e., a semi or fully continuous-throughput process, for example) by the cross-head die 20 to yield the output components.

Figure 3A:
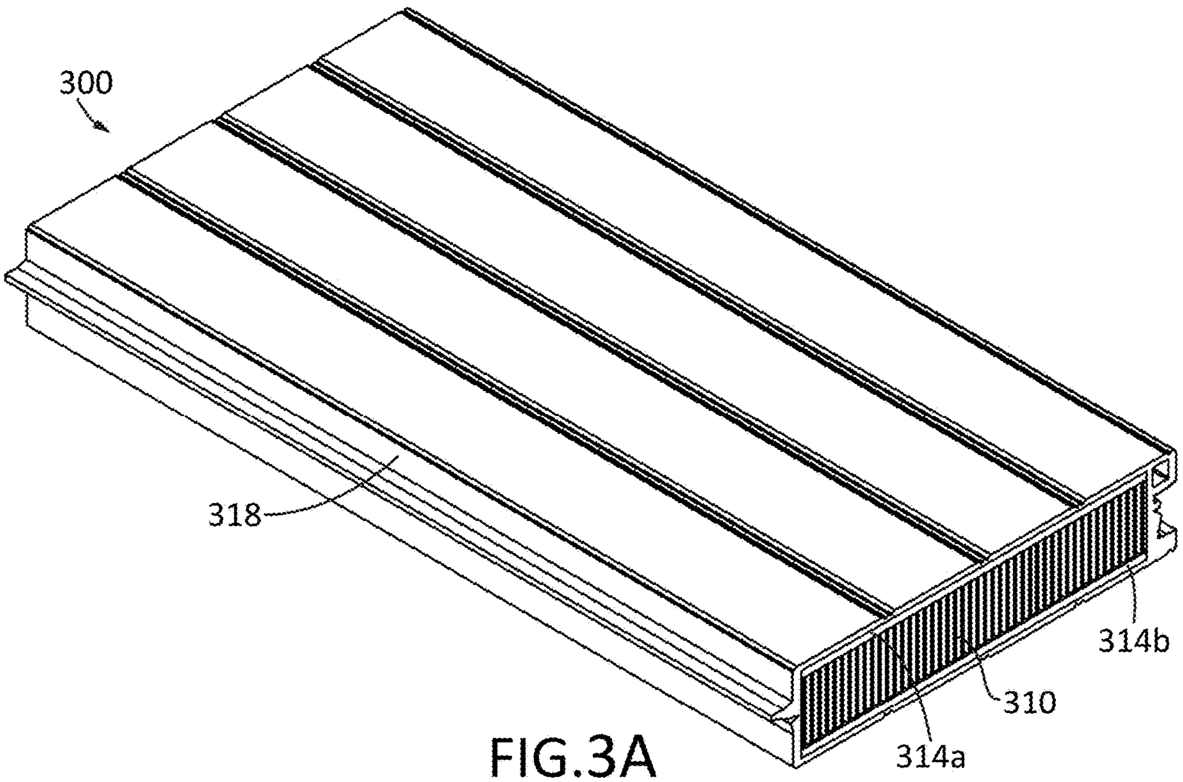
FIG. 3A is a perspective view of an illustration of an example multi-material, multi-layer, geometric infilled deck board.
Figure 3B:
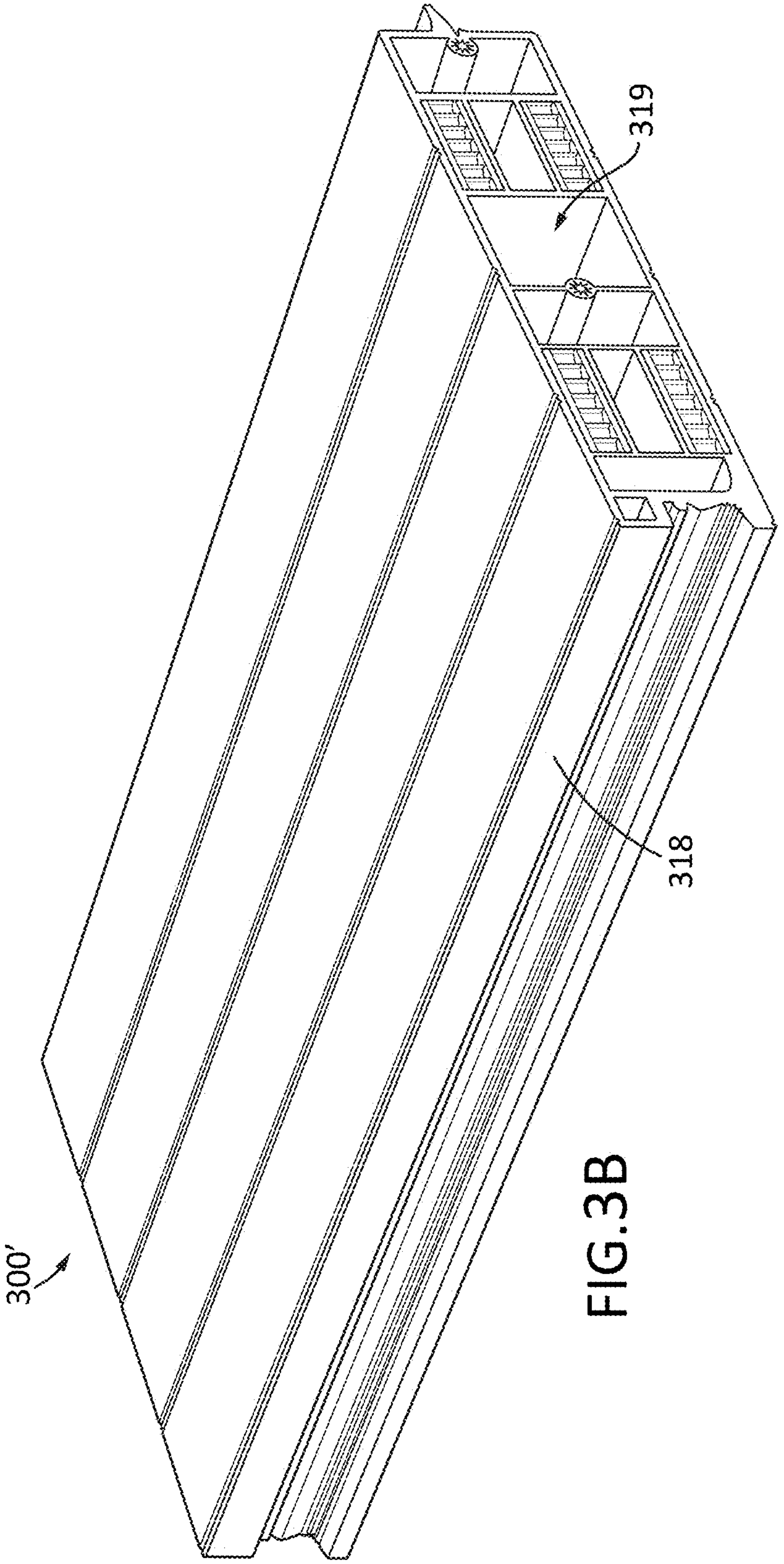
FIG. 3B is a perspective view of an illustration of another example multi-material, multi-layer, geometric infilled deck board.

Turning now to FIGS. 3, FIG. 3A is a perspective view of an illustration of an example multi-material, multi-layer, geometric infilled deck board; and FIG. 3B is a perspective view of an illustration of another example multi-material, multi-layer, geometric infilled deck board. In one aspect, any shape and style of deck board 300 may be extruded. In another aspect, the deck board 300 includes a geometric infill 310, lineal reinforcement 314*a*, lineal reinforcement 314*b*, and polymeric shell 318.

In another aspect, as illustrated in FIG. 3A, the deck board 300 has a total of two lineal reinforcements. Furthermore, in one aspect, there is one individual geometric infills. In another aspect, the polymeric shell can define various useful or ornamental features of the deck board 300.

In another aspect, as illustrated in FIG. 3B, the deck board 300' has a total of eight lineal reinforcements. Furthermore, in one aspect, there are four individual geometric infills. In another aspect, void region(s) 319 are placed where strength is not required and to save on polymeric costs.

Figure 4A:
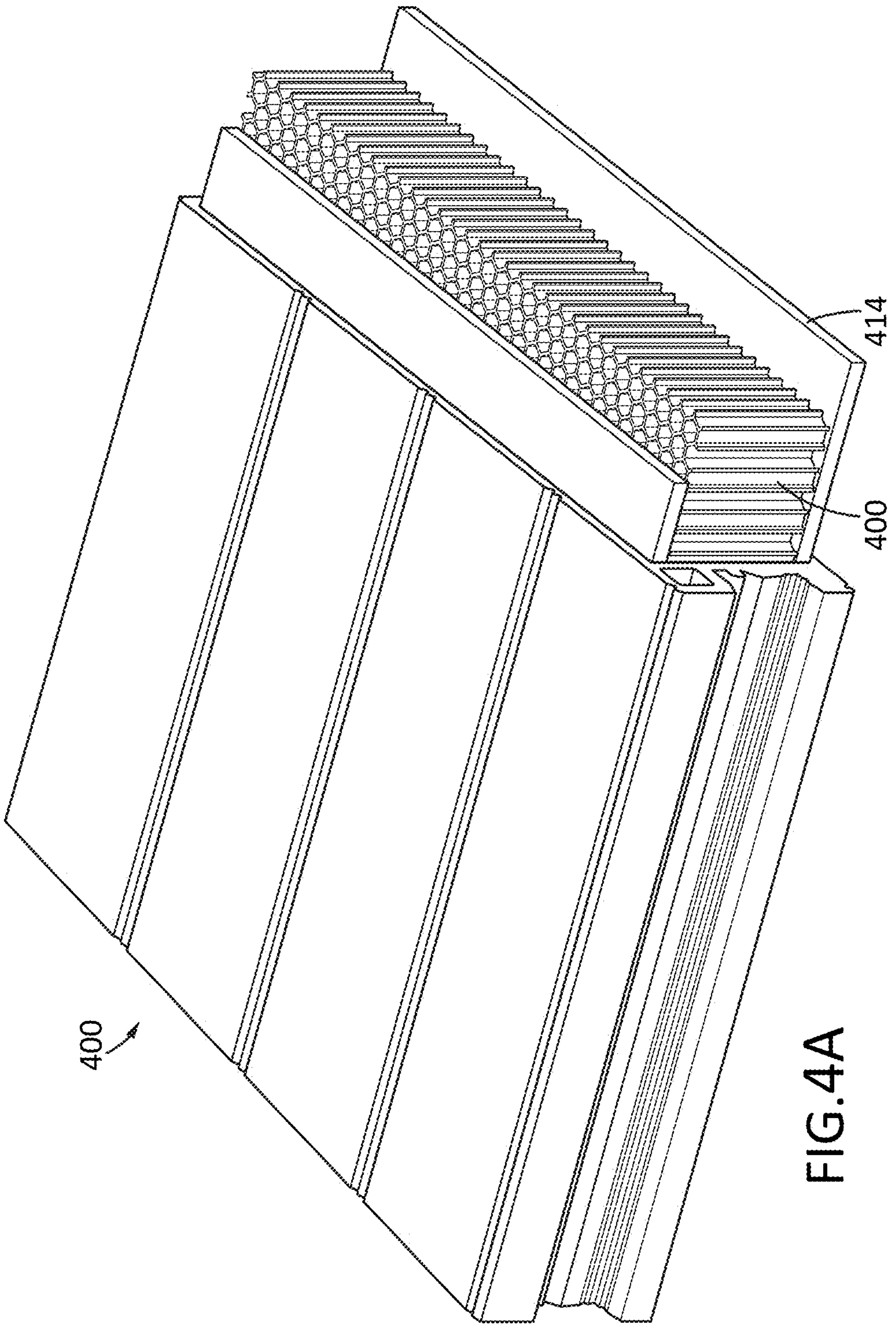
FIG. 4A is an exploded perspective view of an illustration of an example multi-material, multi-layered, geometric infilled deck board.
Figure 4B:
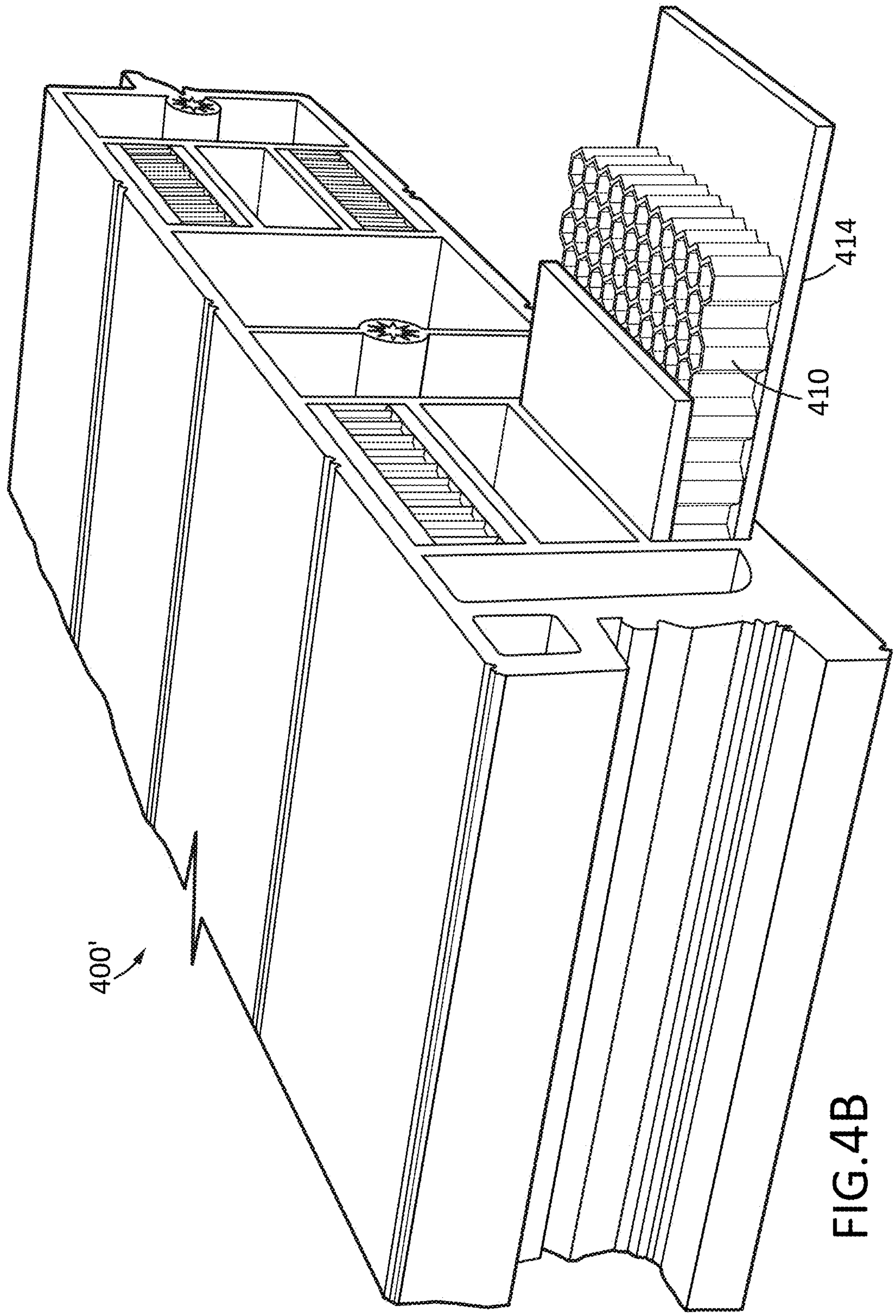
FIG. 4B is an exploded perspective view of an illustration of another example multi-material, multi-layer, geometric infilled deck board.

Turning now to FIGS. 4, FIG. 4A is an exploded perspective view of an illustration of example multi-material, multi-layered, geometric infilled deck board; and FIG. 4B is an exploded perspective view of an illustration of another example multi-material, multi-layer, geometric infilled deck board. In one aspect, lineal reinforcements 414 of the deck board 400 (the deck board 400' in FIG. 4B) include a non-woven rigid composite and a mesh lining engaged to a geometric infill 410. In another aspect, the lineal reinforcements 414 include a woven rigid composite and carbon fiber, or bast materials, woven and heated and compressed with a polymer.

Figure 5:
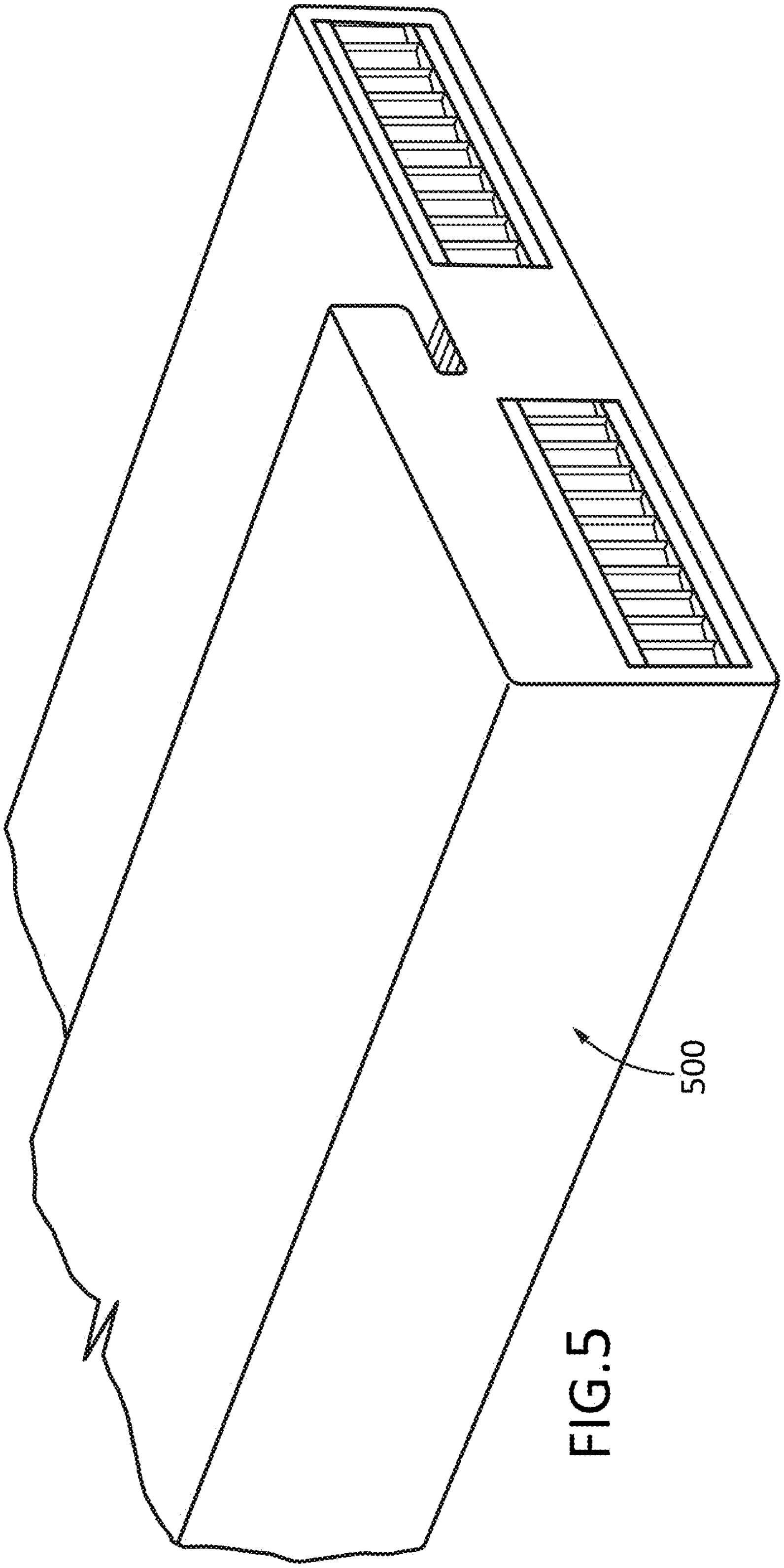
FIG. 5 is a perspective view of an illustration of an example multi-material, multi-layered, geometric infilled lineal for windows and doors.

Turning now to FIG. 5, FIG. 5 is a perspective view of an illustration of an example multi-material, multi-layered, geometric infilled lineal for windows and doors. In one aspect, the lineal 500 is a solid polymeric form with four lineal reinforcements and two geometric infills. In another aspect, the location of the geometric infill is dependent upon the strength required and positioning of the lineal reinforcements. In another aspect, the required strength to weight ratio is achieved by providing the geometric infill between two lineal reinforcements.

Figure 6:
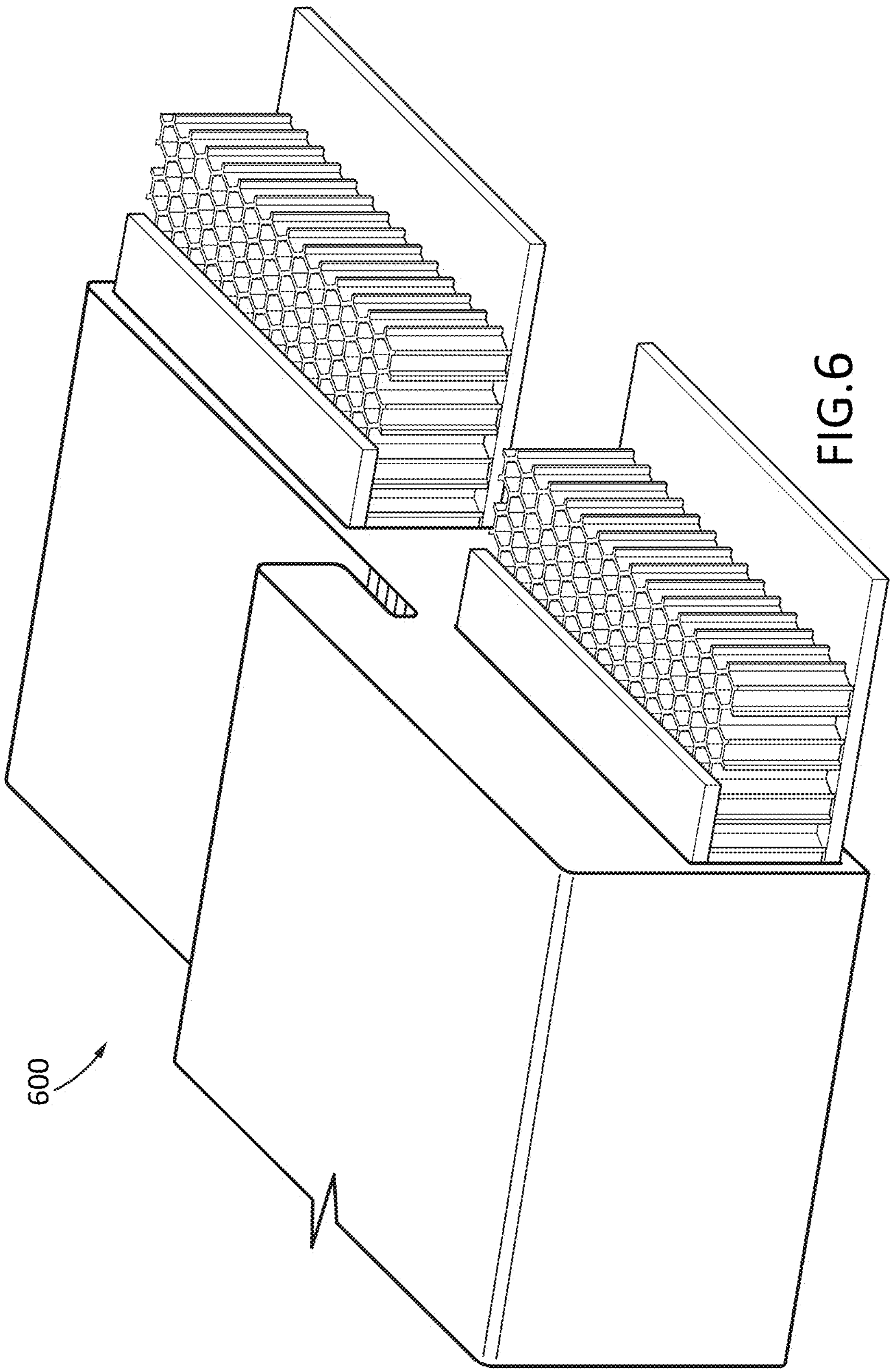
FIG. 6 is an exploded perspective view of an example multi-material, multi-layered, geometric infilled lineal for windows and doors.

Turning now to FIG. 6, FIG. 6 is an exploded perspective view of an example multi-material, multi-layered, geometric infilled lineal for windows and doors. In one aspect, the lineal 600 is configured as a frame, sill, jamb, glazing stop, astragal, grille, and other window or door components.

Figure 7:
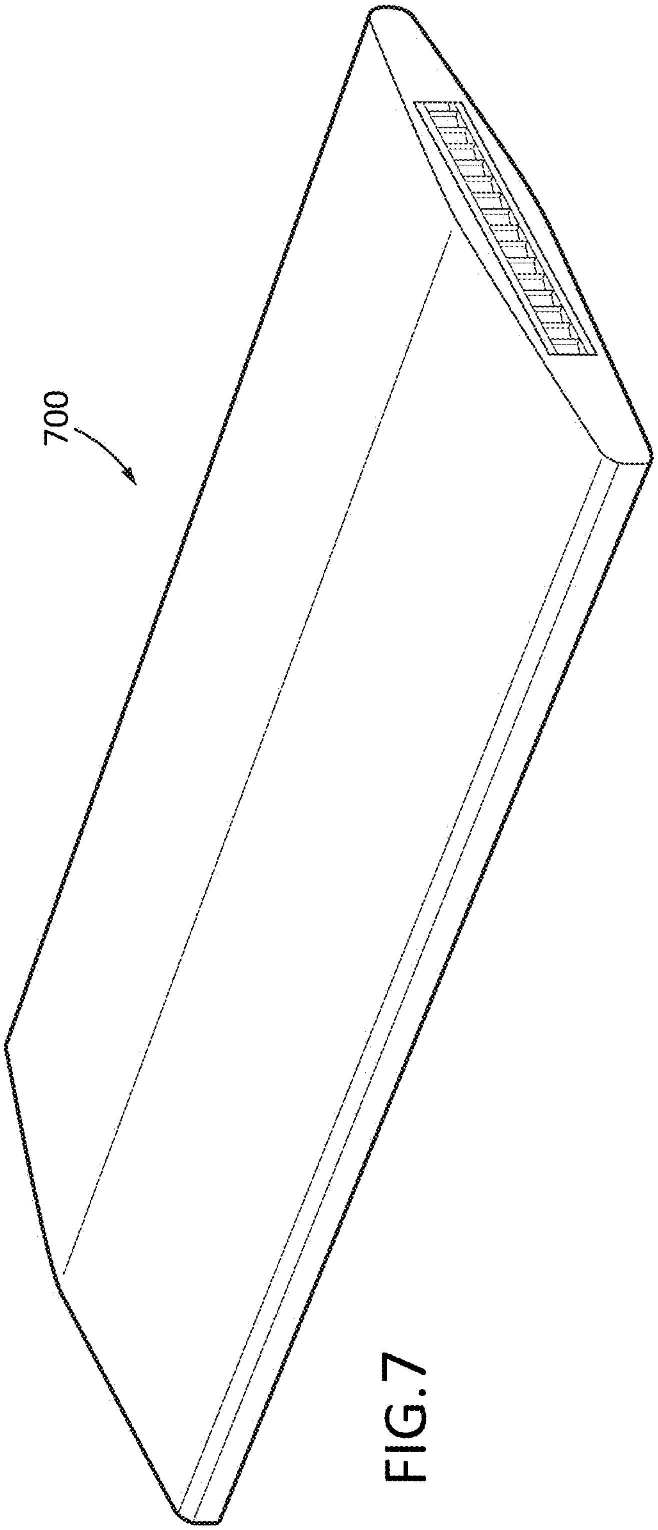
FIG. 7 is a perspective view of an example multi-material, multi-layered, geometric infilled louver for window treatments.

Turning now to FIG. 7, FIG. 7 is a perspective view of an example multi-material, multi-layered, geometric infilled louver for window treatments. In one aspect, the louver 700 is a thin object that spans a large distance relative to its aspect ratio. Thus, louvers face large amounts of gravitational pressure, and over time end up sagging or creeping. Thus, in another aspect, the disclosure herein remedies this by providing a louver 700 that is not prone to creep or sag, and that is resilient to temperature changes, intense sunlight, and friction from movement. Furthermore, in another aspect, the louver 700 herein may be painted, or may have an additional additive or surface coating that allows for painting. Furthermore, other additives may be included to help resist breakdown of the polymers from sunlight, and fire retardants to help ensure the safety of the home and those in it.

Figure 8:
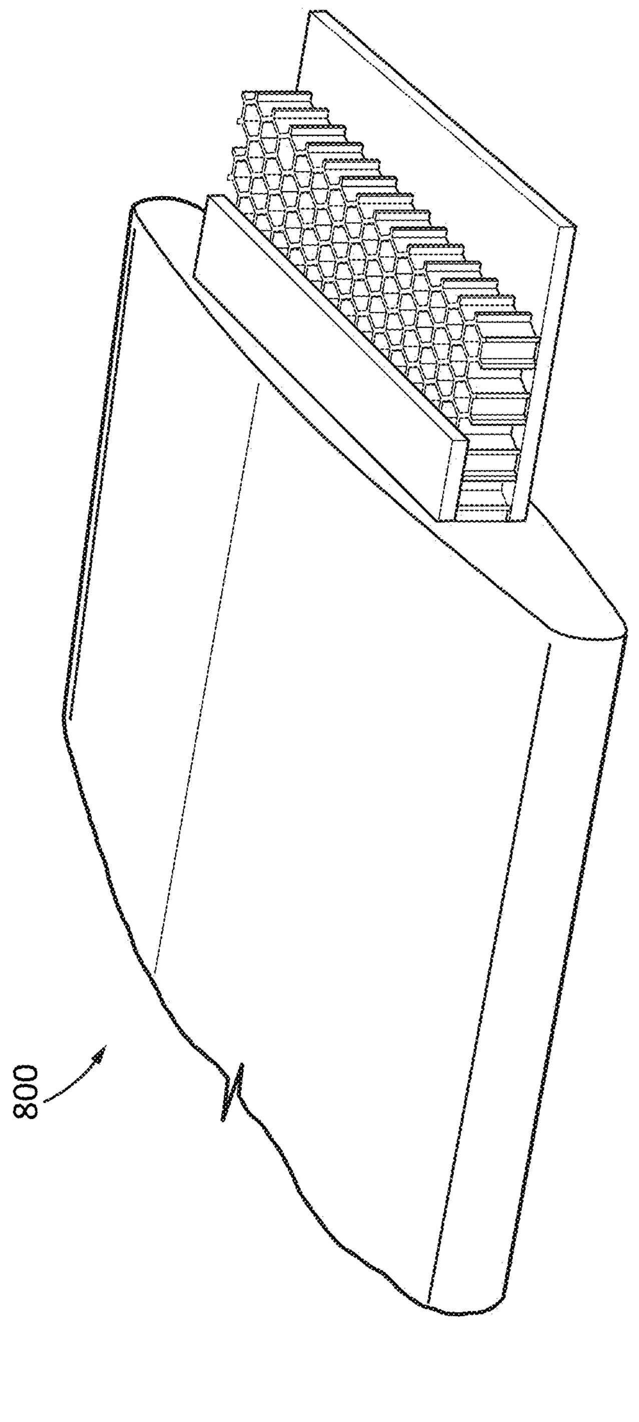
FIG. 8 is an exploded perspective view of an example multi-material, multi-layered, geometric infilled louver for window treatments.

Turning now to FIG. 8, FIG. 8 is an exploded perspective view of an example multi-material, multi-layered, geometric infilled louver for window treatments. In one aspect, the louver 800 includes a stacking of the layers and materials to form the multi-layer, multi-material, geometric infill component.

Figure 9:
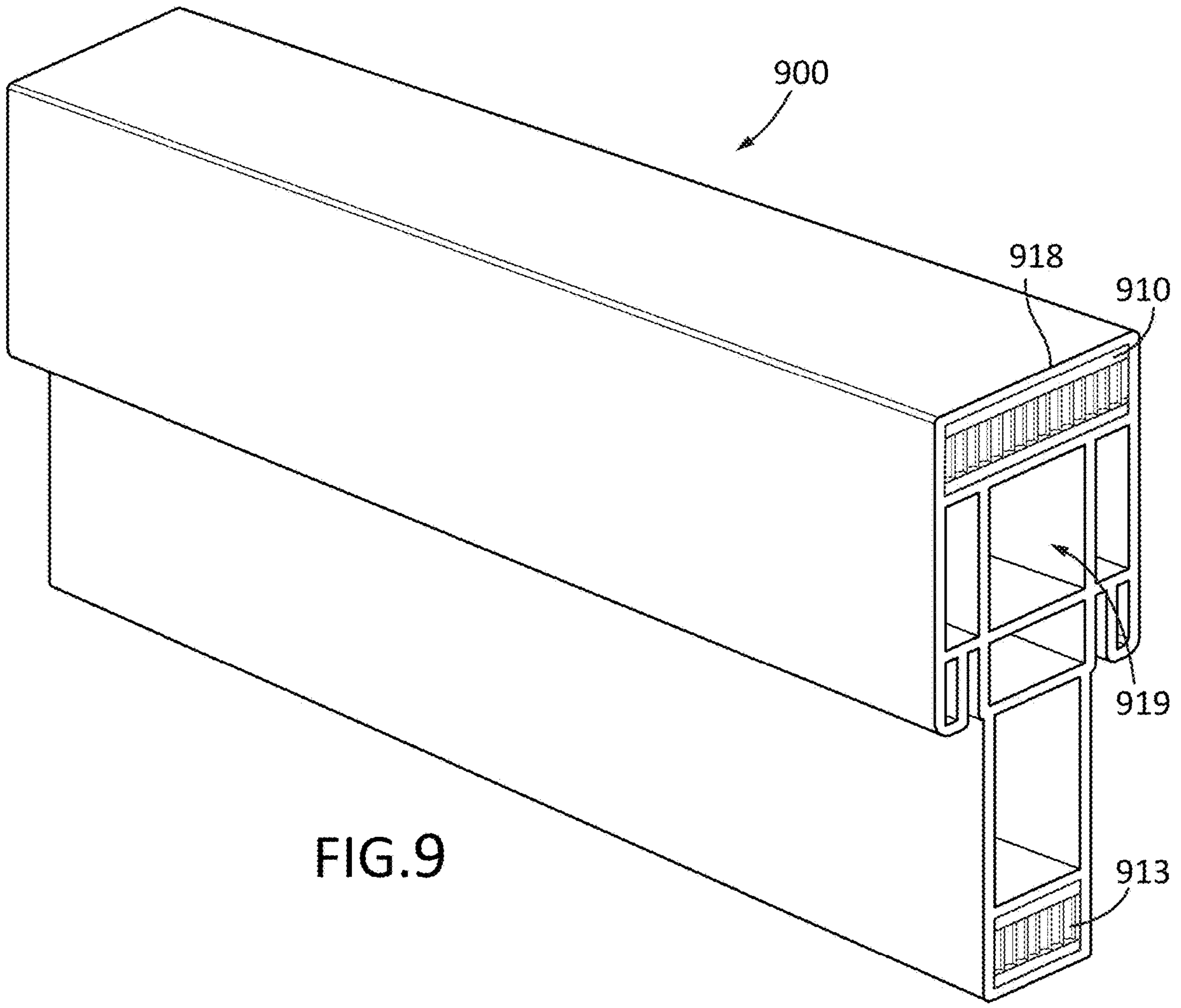
FIG. 9 is a perspective view of an example multi-material, multi-layered, geometric infilled lineal with gaps for windows and doors.

Turning now to FIG. 9, FIG. 9 is a perspective view of an example multi-material, multi-layered, geometric infilled lineal with gaps for windows and doors. In one aspect, the lineal 900 has gaps 919 and is formed from lineal reinforcements 910, the geometric infill 913, and the polymeric form 918.

Figure 10:
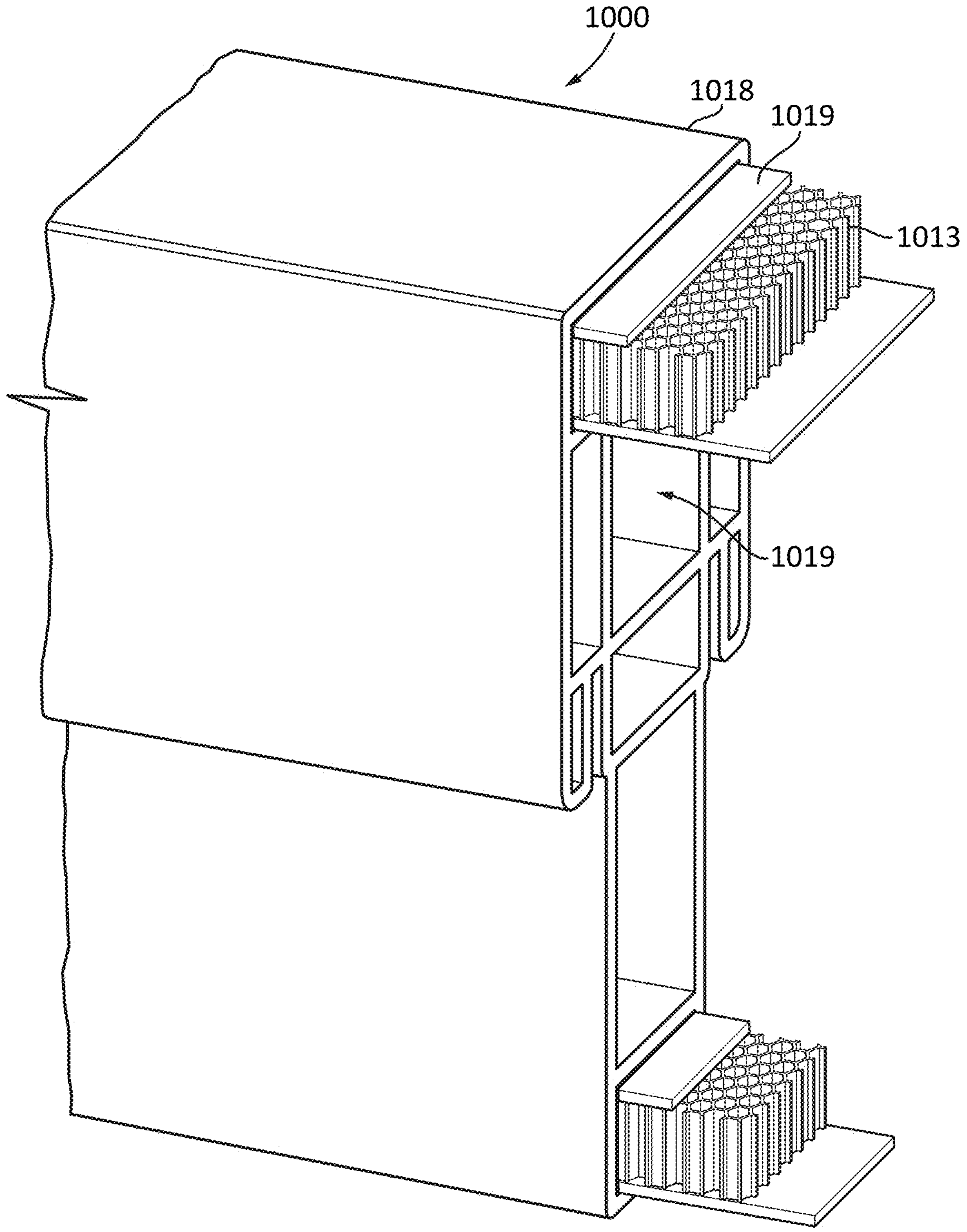
FIG. 10 is an exploded perspective view of an example multi-material, multi-layered, geometric infilled lineal with gaps for windows and doors.

Turning now to FIG. 10, FIG. 10 is an exploded perspective view of an example multi-material, multi-layered, geometric infilled lineal with gaps for windows and doors. In one aspect, the lineal 1000 has gaps 1019 and is formed from lineal reinforcements 1010, the geometric infill 1013, and the polymeric form 1018.

Figure 11A:
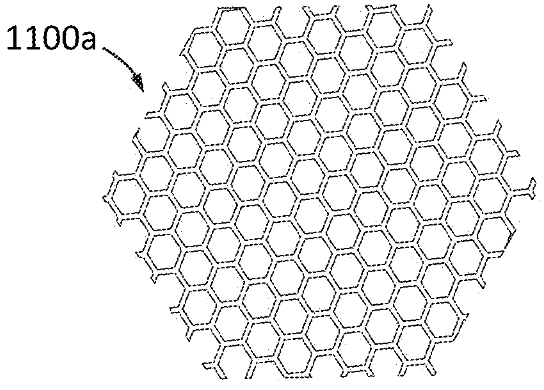
FIG. 11A is a perspective view of a first example of a profile side or a profile end of a geometric infill according to the present disclosure.

Turning now to FIG. 11A, FIG. 11A is a perspective view of a first example of a profile side or a profile end of a geometric infill according to the present disclosure. In particular, in one aspect, the geometric infill 1100*a* is a honeycomb infill defined by a grid made of hexagons.

Figure 11B:
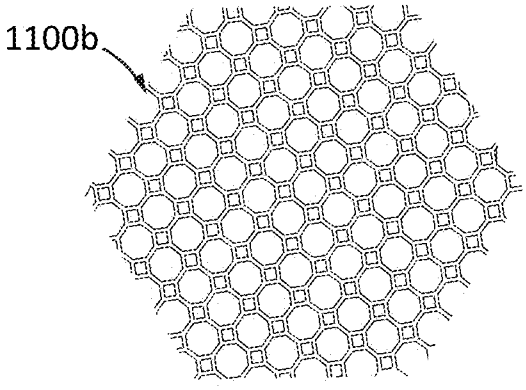
FIG. 11B is a perspective view of a second example of a profile side or a profile end of a geometric infill according to the present disclosure.

Turning now to FIG. 11B, FIG. 11B is a perspective view of a second example of a profile side or a profile end of a geometric infill according to the present disclosure. In particular, in one aspect, the geometric infill 1100*b* is a three dimensional (3D) honey comb infill defined by a grid made of squares and octagons.

Figure 11C:
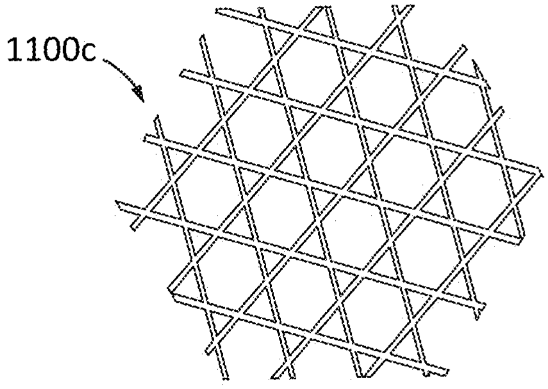
FIG. 11C is a perspective view of a third example of a profile side or a profile end of a geometric infill according to the present disclosure.

Turning now to FIG. 11C, FIG. 11C is a perspective view of a third example of a profile side or a profile end of a geometric infill according to the present disclosure. In particular, in one aspect, the geometric infill 1100*c* is a cubic infill defined by cubes oriented with one corner facing down.

Figure 11D:
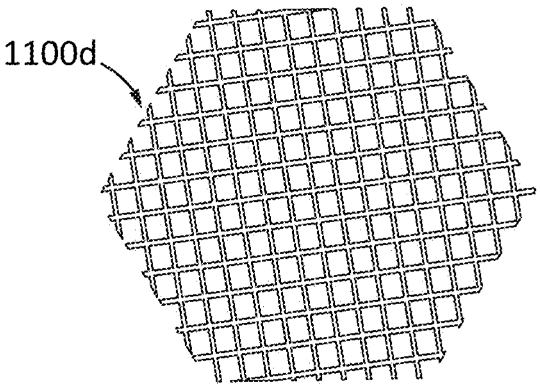
FIG. 11D is a perspective view of a fourth example of a profile side or a profile end of a geometric infill according to the present disclosure.

Turning now to FIG. 11D, FIG. 11D is a perspective view of a fourth example of a profile side or a profile end of a geometric infill according to the present disclosure. In particular, in one aspect, the geometric infill 1100*d* is a rectilinear infill defined by a rectilinear grid.

Figure 11E:
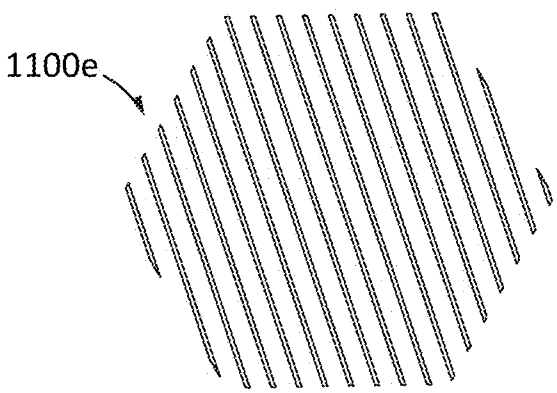
FIG. 11E is a perspective view of a fifth example of a profile side or a profile end of a geometric infill according to the present disclosure.

Turning now to FIG. 11E, FIG. 11E is a perspective view of a fifth example of a profile side or a profile end of a geometric infill according to the present disclosure. In particular, in one aspect, the geometric infill 1100*e* is an aligned rectilinear infill defined by a rectilinear grid with internal parallel lines as support structures.

Figure 11F:
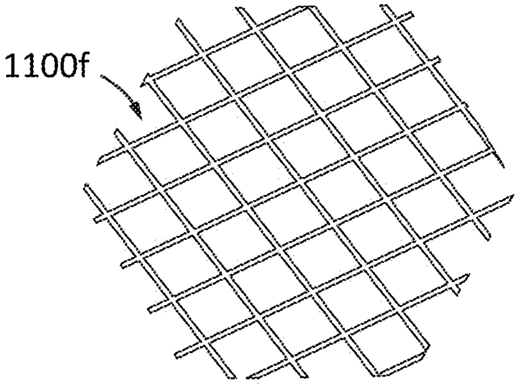
FIG. 11F is a perspective view of a sixth example of a profile side or a profile end of a geometric infill according to the present disclosure.

Turning now to FIG. 11F, FIG. 11F is a perspective view of a sixth example of a profile side or a profile end of a geometric infill according to the present disclosure. In particular, in one aspect, the geometric infill 1100*f* is a grid infill.

Figure 11G:
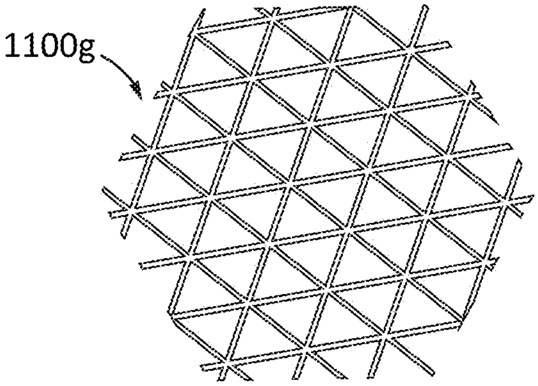
FIG. 11G is a perspective view of a seventh example of a profile side or a profile end of a geometric infill according to the present disclosure.

Turning now to FIG. 11G, FIG. 11G is a perspective view of a seventh example of a profile side or a profile end of a geometric infill according to the present disclosure. In particular, in one aspect, the geometric infill 1100*g* is a triangle infill similar to a grid infill but with three sides.

Figure 11H:
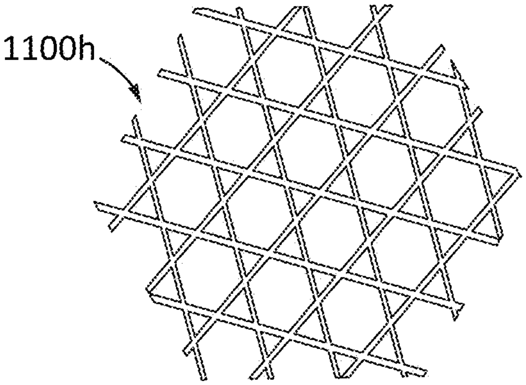
FIG. 11H is a perspective view of an eighth example of a profile side or a profile end of a geometric infill according to the present disclosure.

Turning now to FIG. 11H, FIG. 11H is a perspective view of an eighth example of a profile side or a profile end of a geometric infill according to the present disclosure. In particular, in one aspect, the geometric infill 1100*h* is a star infill defined by a triangle infill but shifted to make a six-point star.

Figure 11I:
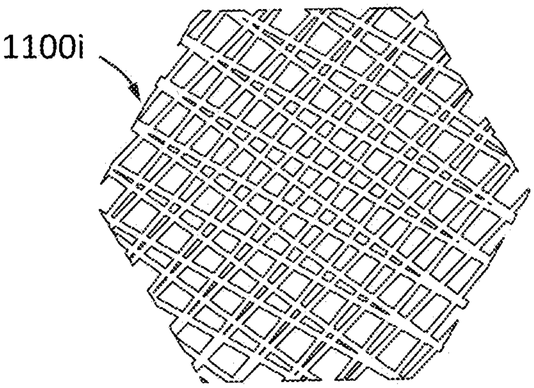
FIG. 11I is a perspective view of a ninth example of a profile side or a profile end of a geometric infill according to the present disclosure.

Turning now to FIG. 11I, FIG. 11I is a perspective view of a ninth example of a profile side or a profile end of a geometric infill according to the present disclosure. In particular, in one aspect, the geometric infill 1100*i* is a line infill similar to a rectilinear infill but with lines at acute angles.

Figure 11J:
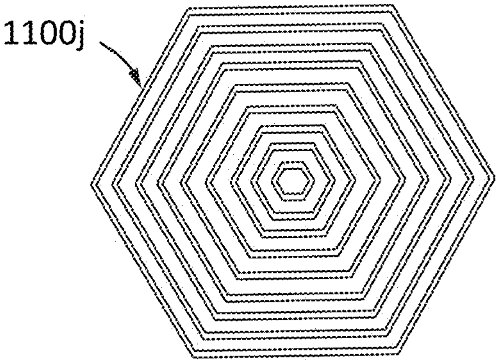
FIG. 11J is a perspective view of a tenth example of a profile side or a profile end of a geometric infill according to the present disclosure.

Turning now to FIG. 11J, FIG. 11J is a perspective view of a tenth example of a profile side or a profile end of a geometric infill according to the present disclosure. In particular, in one aspect, the geometric infill 1100*j* is a concentric infill defined by matching lines to the perimeter and making them smaller towards the center.

Figure 11K:
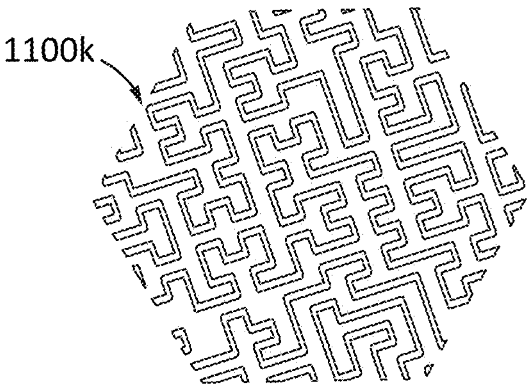
FIG. 11K is a perspective view of an eleventh example of a profile side or a profile end of a geometric infill according to the present disclosure.

Turning now to FIG. 11K, FIG. 11K is a perspective view of an eleventh example of a profile side or a profile end of a geometric infill according to the present disclosure. In particular, in one aspect, the geometric infill 1100*k* is a Hilbert infill defined by a rectilinear labyrinth.

Figure 11L:
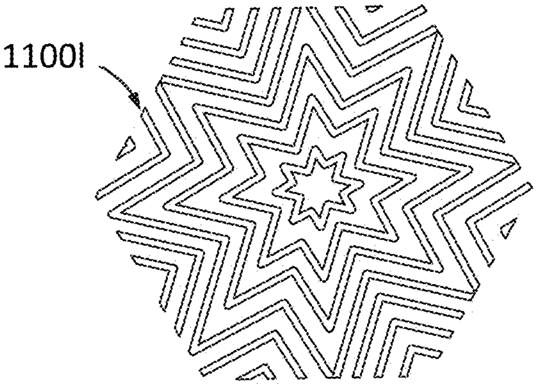
FIG. 11L is a perspective view of a twelfth example of a profile side or a profile end of a geometric infill according to the present disclosure.

Turning now to FIG. 11L, FIG. 11L is a perspective view of a twelfth example of a profile side or a profile end of a geometric infill according to the present disclosure. In particular, in one aspect, the geometric infill 11001 is an octagram spiral infill defined by an octagram spiral.

Figure 12:
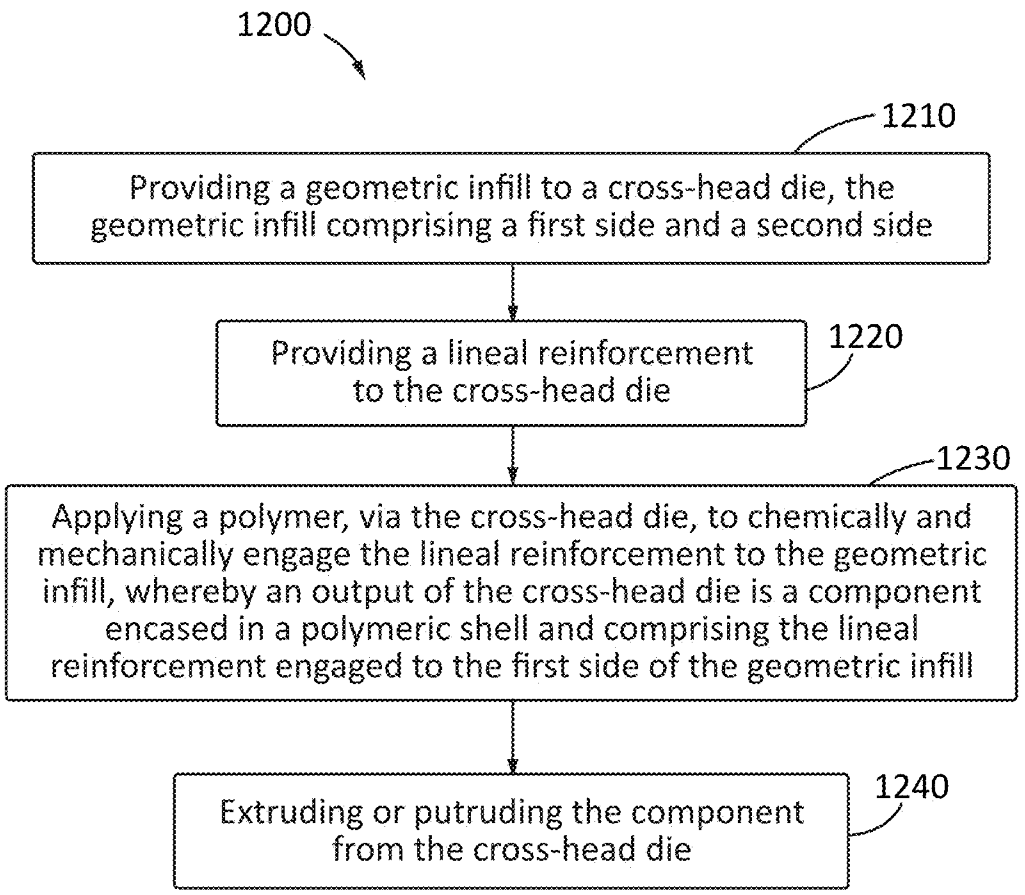
FIG. 12 is a flowchart of an example method of forming a multi-material, multi-layer, geometric infilled component.

Turning now to FIG. 12, FIG. 12 is a flowchart of an example method of forming a multi-material, multi-layer, geometric infilled component. In one aspect, at step 1210, the method 1200 includes the method step of providing a geometric infill to a cross-head die, the geometric infill comprising a first side and a second side. In another aspect, at step 1220, the method 1200 includes providing a lineal reinforcement to the cross-head die. In another aspect, at step 1230, the method 1200 includes applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill. In another aspect, at step 1240, the method 1200 includes extruding or pultruding the component from the cross-head die.

Figure 13:
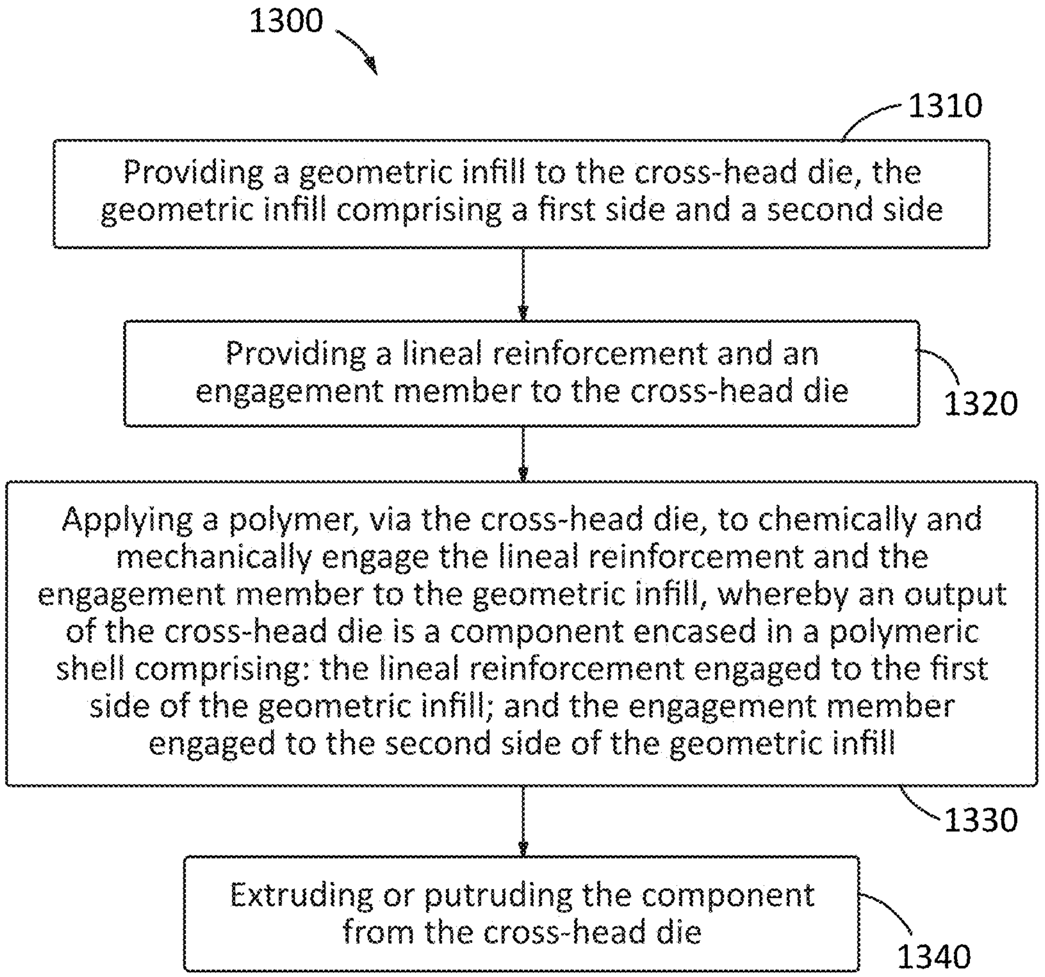
FIG. 13 is a flowchart of an example method of forming a multi-material, multi-layer, geometric infilled component.

Turning now to FIG. 13, FIG. 13 is a flowchart of an example method of forming a multi-material, multi-layer, geometric infilled component. In one aspect, at step 1310, the method 1300 includes providing a geometric infill to a cross-head die, the geometric infill comprising a first side and a second side. In another aspect, at step 1320, the method 1300 includes providing a lineal reinforcement and an engagement member to the cross-head die. In another aspect, at step 1330, the method 1300 includes applying a polymer, via the cross-head die, to chemically and mechanically engage the lineal reinforcement and the engagement member to the geometric infill, whereby an output of the cross-head die is a component encased in a polymeric shell comprising: the lineal reinforcement engaged to the first side of the geometric infill; and the engagement member engaged to the second side of the geometric infill. In another aspect, at step 1340, the method 1300 includes extruding or pultruding the component from the cross-head die.

Figure 14:
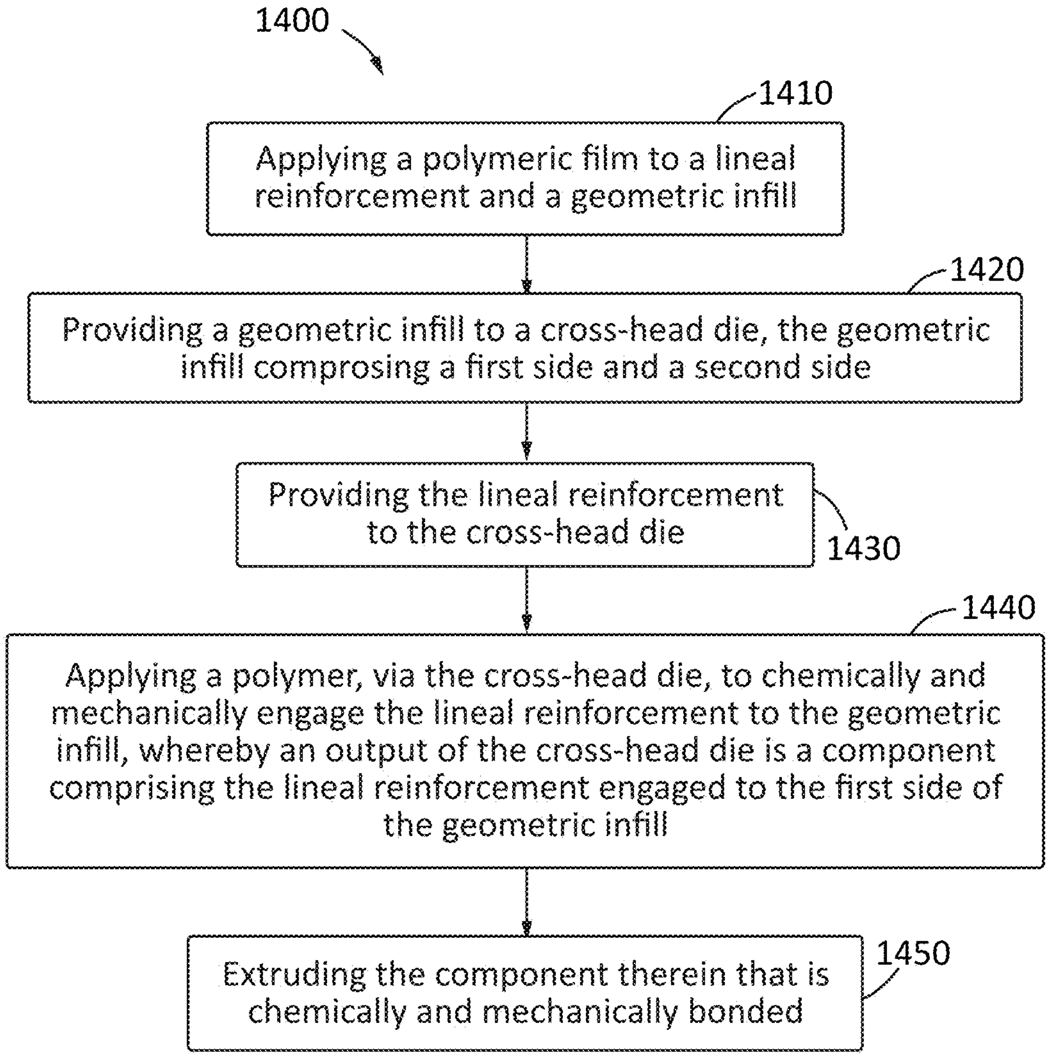
FIG. 14 is a flowchart of an example method of forming a multi-material, multi-layer, geometric infilled component.

Turning now to FIG. 14, FIG. 14 is a flowchart of an example method of forming a multi-material, multi-layer, geometric infilled component. In one aspect, at step 1410, the method 1400 includes applying a polymeric film to a lineal reinforcement and a geometric infill. In one aspect, at step 1420, the method 1400 includes providing the geometric infill to a cross-head die, the geometric infill comprising a first side and a second side. In another aspect, at step 1430, the method 1400 includes providing the lineal reinforcement to the cross-head die. In another aspect, at step 1440, the method 1400 includes applying a polymer, via the cross-head die, to chemically and mechanically engage the lineal reinforcement to the geometric infill, whereby an output of the cross-head die is a component comprising the lineal reinforcement engaged to the first side of the geometric infill. In another aspect, at step 1450, the method 1400 includes extruding or pultruding the component from the cross-head dic.

IV. Embodiments

Certain implementations of systems and methods consistent with the present disclosure are provided as clauses:

Clause 1. A method of forming a multi-material, multi-layer, geometric infilled component, comprising: providing a geometric infill to a cross-head die, the geometric infill comprising a first side and a second side; providing a lineal reinforcement to the cross-head die; applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill; and extruding or pultruding the component from the cross-head die.

Clause 2. The method of clause 1, wherein providing the geometric infill comprises providing the geometric infill made of wood pulp or paper to the cross-head die.

Clause 3. The method of clause 2, further comprising unfolding a stack of geometric infill to provide the geometric infill to the cross-head die.

Clause 4. The method of clause 1, wherein providing the geometric infill comprises providing the geometric infill made of PET to the cross-head die.

Clause 5. The method of clause 1, further comprising coating the geometric infill with a surface additive.

Clause 6. The method of clause 1, further comprising coating the lineal reinforcement with a surface additive.

Clause 7. The method of clause 1, further comprising coating the polymeric shell of the component with a surface additive.

Clause 8. A method of forming a multi-material, multi-layer, geometric infilled component, comprising: providing a geometric infill to a cross-head die, the geometric infill comprising a first side and a second side; providing a lineal reinforcement and an engagement member to the cross-head die; applying a polymer, via the cross-head die, to chemically and mechanically engage the lineal reinforcement and the engagement member to the geometric infill, whereby an output of the cross-head die is a component encased in a polymeric shell comprising: the lineal reinforcement engaged to the first side of the geometric infill; and the engagement member engaged to the second side of the geometric infill; and extruding or pultruding the component from the cross-head die.

Clause 9. The method of clause 8, wherein the geometric infill further comprises a third side and a fourth side, the first side opposite the third side, and the second side opposite the fourth side, and the method further comprising providing a second lineal reinforcement to the cross-head die, and applying the polymer via the cross-head die such that the second lineal reinforcement is engaged to the third side or the fourth side.

Clause 10. The method of clause 9, wherein the second lineal reinforcement is engaged to the third side.

Clause 11. The method of clause 8, wherein the geometric infill further comprises a third side and a fourth side, the first side opposite the third side, and the second side opposite the fourth side, and the method further comprising providing a second engagement member to the cross-head die, and applying the polymer via the cross-head die such that the second engagement member is engaged to the third side or the fourth side.

Clause 12. The method of clause 11, wherein the second engagement member is engaged to the fourth side.

Clause 13. The method of clause 8, wherein the geometric infill further comprises a third side and a fourth side, the first side opposite the third side, and the second side opposite the fourth side, and the method further comprising providing a second lineal reinforcement and a second engagement member to the cross-head die, and applying the polymer via the cross-head die such that the second lineal reinforcement is engaged to the third side and such that the second engagement member is engaged to the fourth side.

Clause 14. A method of forming a multi-material, multi-layer, geometric infilled component, comprising: applying a polymeric film to a lineal reinforcement and a geometric infill; providing the geometric infill to a cross-head die, the geometric infill comprising a first side and a second side; providing the lineal reinforcement to the cross-head die; applying a polymer, via the cross-head die, to chemically and mechanically engage the lineal reinforcement to the geometric infill, whereby an output of the cross-head die is a component encased in a polymeric shell comprising the lineal reinforcement engaged to the first side of the geometric infill; and extruding or pultruding the component from the cross-head die.

Clause 15. The method of clause 14, further comprising coating the geometric infill with a surface additive.

Clause 16. The method of clause 14, further comprising coating the lineal reinforcement with a surface additive.

Clause 17. The method of clause 14, further comprising coating the polymeric shell of the component with a surface additive.

Clause 18. The method of clause 14, further comprising providing an engagement member to the cross-head die, and applying the polymer via the cross-head die such that the engagement member is engaged to the second side.

Clause 19. The method of clause 18, further comprising applying a polymeric film to the engagement member prior to providing the engagement member to the cross-head die.

Clause 20. The method of clause 19, further comprising coating the engagement member with a surface additive.

Clause 21. A multi-material, multi-layer, geometric infill component, comprising: a rigid composite layer comprised of a non-woven or woven polymeric material and carbon fiber; a geometric infill layer comprising a geometric infill pattern of lightweight material; a form component comprising a polymeric form encasing the rigid composite layer and the geometric infill layer; and a polymeric film on the rigid composite layer and the geometric infill layer that bonds chemically and mechanically to the polymeric form.

Clause 22. The component of clause 21, wherein the rigid composite layer is further comprises of a mesh material.

Clause 23. The component of clause 21, wherein the geometric infill layer is comprised of paper or wood pulp.

Clause 24. The component of clause 21, wherein the geometric infill layer is comprised of carbon fiber.

Clause 25. The component of clause 21, wherein the geometric infill layer is a hexagonal geometric infill pattern.

Clause 26. The component of clause 21, wherein the polymeric film is polyethylene terephthalate.

Clause 27. The component of clause 21, further comprising a second rigid composite layer comprised of a non-woven or woven composite strip of polymeric material and carbon fiber.

Clause 28. The component of clause 21, further comprising a surface additive of either antioxidants, UV stabilizers, flame retardants, nucleating agents, or coupling agents.

Clause 29. The component of clause 28, wherein the antioxidants comprises hindered phenols or phosphites.

Clause 30. The component of clause 28, wherein the UV stabilizers comprises hindered amine light stabilizers or benzotriazoles.

Clause 31. The component of clause 28, wherein the flame retardants comprise brominated compounds, phosphorous compounds, or metal hydroxides.

Clause 32. The component of clause 28, wherein the coupling agents comprise silanes or titanates.

Clause 33. The component of clause 28, wherein the nucleating agents comprise sorbitol or phosphate salts.

Clause 34. A method for producing a multi-material, multi-layer, geometric infill component, comprising: applying a polymeric film to a rigid composite layer for insertion into a cross-head die, wherein the rigid composite layer comprises a non-woven or woven composite strip; applying the polymeric film to a geometric infill pattern for insertion into the cross-head die; inserting both the rigid composite layer and the geometric infill pattern into the cross-head die; applying a polymer that chemically and mechanically bonds to the polymeric film to the rigid composite layer and the geometric infill pattern; and extruding a component therein that is mechanically and chemically bonded.

Clause 35. The method of clause 34, further comprising coating the rigid composite layer with surface additives.

Clause 36. The method of clause 34, further comprising coating the polymer with surface additives.

Clause 37. The method of clause 34, wherein the rigid composite layer is formed by a process of heating and rolling carbon fiber and a polymer.

Clause 38. The method of clause 34, wherein the rigid composite layer comprises a mesh layer.

Clause 39. The method of clause 34, wherein inserting the rigid composite layer is conducted by unfolding a stack of chopped carbon fiber and polymer non-woven.

Clause 40. The method of clause 39, wherein the rigid composite layer is formed by heating and mechanical pressure once inserted into the cross-head die.

Clause 41. A method of forming a multi-material, multi-layer, geometric infilled component, comprising: applying an adhesive to a geometric infill; providing, to a cross-head die, the geometric infill having a lineal reinforcement along a first side of the geometric infill and the geometric infill having a second side; applying a polymer, via the cross-head die, to chemically and mechanically engage the lineal reinforcement to the geometric infill, whereby an output of the cross-head die is a component encased in a polymeric shell and comprising the lineal reinforcement engaged to the first side of the geometric infill; and extruding or pultruding the component from the cross-head die.

Clause 42. The method of clause 41, wherein applying the adhesive comprises apply a heat-activated adhesive to the geometric infill.

Clause 43. A method of forming a multi-material, multi-layer, geometric infilled component, comprising: applying an adhesive to a geometric infill; providing, to a cross-head die, the geometric infill having a lineal reinforcement along a first side of the geometric infill and an engagement member along a second side of the geometric infill; applying a polymer, via the cross-head die, to chemically and mechanically engage the lineal reinforcement and the engagement member to the geometric infill, whereby an output of the cross-head die is a component encased in a polymeric shell comprising: the lineal reinforcement engaged to the first side of the geometric infill; and the engagement member engaged to the second side of the geometric infill; and extruding or pultruding the component from the cross-head die.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method of forming a multi-material, multi-layer, geometric infilled component, comprising:
- applying an adhesive to a geometric infill;
- providing, to a cross-head die, the geometric infill having a lineal reinforcement along a first side of the geometric infill and an engagement member along a second side of the geometric infill, the engagement member providing an anchor substrate for a fastener;
- applying a polymer, via the cross-head die, whereby an output of the cross-head die is a component encased in a polymeric shell comprising:
  - the lineal reinforcement engaged to the first side of the geometric infill; and
  - the engagement member engaged to the second side of the geometric infill; and
- extruding or pultruding the component from the cross-head die.

2. The method of claim 1, wherein the geometric infill further comprises a third side and a fourth side, the first side opposite the third side, and the second side opposite the fourth side, and the method further comprising providing a second lineal reinforcement to the cross-head die, and applying the polymer via the cross-head die such that the second lineal reinforcement is engaged to the third side or the fourth side.

3. The method of claim 2, wherein the second lineal reinforcement is engaged to the third side.

4. The method of claim 1, wherein the geometric infill further comprises a third side and a fourth side, the first side opposite the third side, and the second side opposite the fourth side, and the method further comprising providing a second engagement member to the cross-head die, and applying the polymer via the cross-head die such that the second engagement member is engaged to the third side or the fourth side.

5. The method of claim 4, wherein the second engagement member is engaged to the fourth side.

6. The method of claim 1, wherein the geometric infill further comprises a third side and a fourth side, the first side opposite the third side, and the second side opposite the fourth side, and the method further comprising providing a second lineal reinforcement and a second engagement member to the cross-head die, and applying the polymer via the cross-head die such that the second lineal reinforcement is engaged to the third side and such that the second engagement member is engaged to the fourth side.

7. A method of forming a multi-material, multi-layer, geometric infilled component, comprising:

applying an adhesive to a lineal reinforcement, an engagement member, and a geometric infill, wherein the geometric infill is comprised of a three-dimensional geometric pattern with voids;

providing the geometric infill to a cross-head die;

providing the lineal reinforcement to the cross-head die;

providing the engagement member to the cross-head die, the engagement member providing an anchor substrate for a fastener;

applying a polymer, via the cross-head die, to chemically and mechanically engage the lineal reinforcement and the engagement member to the geometric infill, whereby an output of the cross-head die is a component encased in a polymeric shell; and extruding or pultruding the component from the cross-head die.

8. The method of claim 7, further comprising coating the geometric infill with a surface additive.

9. The method of claim 7, further comprising coating the lineal reinforcement with a surface additive.

10. The method of claim 7, further comprising coating the polymeric shell of the component with a surface additive to increase bonding.

11. The method of claim 7, further comprising applying a polymeric film to the engagement member prior to providing the engagement member to the cross-head die.

12. The method of claim 11, further comprising coating the engagement member with a surface additive.

* * * * *